(12) United States Patent
Sakhnini et al.

(10) Patent No.: US 11,996,960 B2
(45) Date of Patent: May 28, 2024

(54) TECHNIQUES FOR DETERMINING A CHANNEL ESTIMATION FOR A PHYSICAL BROADCAST CHANNEL SYMBOL OF A SYNCHRONIZATION SIGNAL BLOCK WITH TIME DIVISION MULTIPLEXED SYMBOLS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 17/127,677

(22) Filed: Dec. 18, 2020

(65) Prior Publication Data

US 2022/0200824 A1 Jun. 23, 2022

(51) Int. Cl.
*H04L 25/02* (2006.01)
*H04L 5/00* (2006.01)
*H04W 56/00* (2009.01)

(52) U.S. Cl.
CPC ........ *H04L 25/0228* (2013.01); *H04L 5/0048* (2013.01); *H04W 56/001* (2013.01)

(58) Field of Classification Search
CPC .............. H04L 25/0228; H04L 5/0048; H04L 25/0232; H04W 56/001
See application file for complete search history.

(56) References Cited

U.S. PATENT DOCUMENTS 10,512,051 B2 * 12/2019 Ly ........................... H04L 5/005
10,880,864 B2 * 12/2020 Zhang ................... H04L 5/1453
2020/0267674 A1 8/2020 Ji et al.
2020/0313835 A1 * 10/2020 Ji ........................... H04L 5/0044
2020/0389786 A1 * 12/2020 Yerramalli .......... H04L 27/2646
2021/0377852 A1 * 12/2021 Zhou ................... H04W 72/042
2022/0116968 A1 * 4/2022 Choi ..................... H04L 5/0053
2022/0150851 A1 * 5/2022 Tian ...................... H04L 5/0051

FOREIGN PATENT DOCUMENTS

WO WO-2020010905 A1 1/2020
WO WO-2020061494 A1 3/2020

OTHER PUBLICATIONS

International Search Report and Written Opinion—PCT/US2021/059927—ISA/EPO—dated Mar. 17, 2022.

* cited by examiner

*Primary Examiner* — Justin T Van Roie
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, via a single carrier communication, a synchronization signal block (SSB) with time division multiplexed symbols that include a physical broadcast channel (PBCH) symbol and one or more of a primary synchronization signal (PSS) symbol, a secondary synchronization signal (SSS) symbol, or a demodulation reference signal (DMRS) symbol. The UE may demodulate the PBCH symbol using a channel estimation for the PBCH symbol that is based at least in part on one or more channel estimations of the PSS symbol, the SSS symbol, or the DMRS symbol. Numerous other aspects are described.

30 Claims, 12 Drawing Sheets

500A →

1. Channel estimate TD interpolation
2. Freq offset est

500B →

1. Channel estimate TD interpolation
2. Freq offset est

500C

1. Channel estimate TD interpolation
2. Freq offset est

500D

1. Channel estimate TD interpolation
2. Freq offset est

500G ➔

500H ➔

1. Channel estimate TD interpolation
2. Freq offset est

TECHNIQUES FOR DETERMINING A CHANNEL ESTIMATION FOR A PHYSICAL BROADCAST CHANNEL SYMBOL OF A SYNCHRONIZATION SIGNAL BLOCK WITH TIME DIVISION MULTIPLEXED SYMBOLS

FIELD OF THE DISCLOSURE

Aspects of the present disclosure generally relate to wireless communication and to techniques and apparatuses for determining a channel estimation for a physical broadcast channel symbol of a synchronization signal block with time division multiplexed symbols.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, via a single carrier communication, a synchronization signal block (SSB) with time division multiplexed symbols that include a physical broadcast channel (PBCH) symbol and one or more of a primary synchronization signal (PSS) symbol, a secondary synchronization signal (SSS) symbol, or a demodulation reference signal (DMRS) symbol; and demodulating the PBCH symbol using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the method further comprises: determining a first channel estimation for the DMRS symbol, determining a second channel estimation for the SSS symbol, and interpolating the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the method further comprises: determining a first channel estimation for the first SSS symbol, determining a second channel estimation for the second SSS symbol, and interpolating the channel estimation for the PBCH symbol based at least in part on the first channel estimation and the second channel estimation.

In some aspects, the method includes determining a cell identification (ID) associated with the SSB based at least in part on a sequence detected in the first SSS symbol, or determining a cell ID associated with the SSB based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the method further comprises: determining a first channel estimation for the PSS symbol, determining a second channel estimation for the one of the SSS symbol or the DMRS symbol, and interpolating the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the method further comprises: determining a channel estimation for the PSS symbol, and determining the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the method further comprises: determining a channel estimation for the DMRS symbol or the SSS symbol, and determining the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, the method includes determining a frequency offset for the PBCH symbol based at least in part on measurement of one or more of the PSS symbol, the SSS symbol, or the DMRS symbol.

In some aspects, a UE for wireless communication includes a memory; and one or more processors operatively coupled to the memory, the memory and the one or more processors configured to: receive, via a single carrier communication, an SSB with time division multiplexed symbols that include a PBCH symbol and one or more of a PSS symbol, an SSS symbol, or a DMRS symbol; and demodulate the PBCH symbol using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the one or more processors are further configured to: determine a first channel estimation for the DMRS symbol, determine a second channel estimation for the SSS symbol, and interpolate the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the one or more processors are further configured to: determine a first channel estimation for the first SSS symbol, determine a second channel estimation for the second SSS symbol, and interpolate the channel estimation for the PBCH symbol based at least in part on the first channel estimation and the second channel estimation.

In some aspects, the one or more processors are further configured to: determine a cell ID associated with the SSB based at least in part on a sequence detected in the first SSS symbol, or determine a cell ID associated with the SSB based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the one or more processors are further configured to: determine a first channel estimation for the PSS symbol, determine a second channel estimation for the one of the SSS symbol or the DMRS symbol, and interpolate the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the one or more processors are further configured to: determine a channel estimation for the PSS symbol, and determine the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the one or more processors are further configured to: determine a channel estimation for the DMRS symbol or the SSS symbol, and determine the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, the one or more processors are further configured to: determine a frequency offset for the PBCH symbol based at least in part on measurement of one or more of the PSS symbol, the SSS symbol, or the DMRS symbol.

In some aspects, a non-transitory computer-readable medium storing a set of instructions for wireless communication includes one or more instructions that, when executed by one or more processors of a UE, cause the UE to: receive, via a single carrier communication, an SSB with time division multiplexed symbols that include a PBCH symbol and one or more of a PSS symbol, an SSS symbol, or a DMRS symbol; and demodulate the PBCH symbol using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the one or more instructions further cause the UE to: determine a first channel estimation for the DMRS symbol, determine a second channel estimation for the SSS symbol, and interpolate the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the one or more instructions further cause the UE to: determine a first channel estimation for the first SSS symbol, determine a second channel estimation for the second SSS symbol, and interpolate the channel estimation for the PBCH symbol based at least in part on the first channel estimation and the second channel estimation.

In some aspects, the one or more instructions further cause the UE to: determine a cell ID associated with the SSB based at least in part on a sequence detected in the first SSS symbol, or determine a cell ID associated with the SSB based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the one or more instructions further cause the UE to: determine a first channel estimation for the PSS symbol, determine a second channel estimation for the one of the SSS symbol or the DMRS symbol, and interpolate the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the one or more instructions further cause the UE to: determine a channel estimation for the PSS symbol, and determine the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the one or more instructions further cause the UE to: determine a channel estimation for the DMRS symbol or the SSS symbol, and determine the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, the one or more instructions further cause the UE to: determine a frequency offset for the PBCH symbol based at least in part on measurement of one or more of the PSS symbol, the SSS symbol, or the DMRS symbol.

In some aspects, an apparatus for wireless communication includes means for receiving, via a single carrier communication, an SSB with time division multiplexed symbols that include a PBCH symbol and one or more of a PSS symbol, an SSS symbol, or a DMRS symbol; and means for demodulating the PBCH symbol using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and further comprising: means for determining a first channel estimation for the DMRS symbol, means for determining a second channel estimation for the SSS symbol, and means for interpolating the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and further comprising: means for determining a first channel estimation for the first SSS symbol, means for determining a second channel estimation for the second SSS symbol, and means for interpolating the channel estimation for the PBCH symbol based at least in part on the first channel estimation and the second channel estimation.

In some aspects, the apparatus includes means for determining a cell ID associated with the SSB based at least in part on a sequence detected in the first SSS symbol, or means for determining a cell ID associated with the SSB based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and further comprising: means for determining a first channel estimation for the PSS symbol, means for determining a second channel estimation for the one of the SSS symbol or the DMRS symbol, and means for interpolating the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and further comprising: means for determining a channel estimation for the PSS symbol, and means for determining the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and further comprising: means for determining a channel estimation for the DMRS symbol or the SSS symbol, and means for determining the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, the apparatus includes means for determining a frequency offset for the PBCH symbol based at least in part on measurement of one or more of the PSS symbol, the SSS symbol, or the DMRS symbol.

In some aspects, a method of wireless communication performed by a base station includes configuring an SSB with time division multiplexed symbols that include a PBCH symbol and one or more of a PSS symbol, an SSS symbol, or a DMRS symbol; transmitting the SSB via a single carrier communication, wherein the PBCH is configured to be demodulated using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the PBCH is configured to be demodulated based at least in part on: a determination of a first channel estimation for the DMRS symbol, a determination of a second channel estimation for the SSS symbol, and an interpolation of the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the PBCH is configured to be demodulated based at least in part on: a determination of a first channel estimation for the first SSS symbol, a determination of a second channel estimation for the second SSS symbol, and an interpolation of the channel estimation for the PBCH symbol based at least in part on the first channel estimation and the second channel estimation.

In some aspects, the SSB indicates a cell ID associated with the SSB based at least in part on a sequence in the first SSS symbol, or wherein the SSB indicates a cell based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the PBCH is configured to be demodulated based at least in part on: a determination of a first channel estimation for the PSS symbol, a determination of a second channel estimation for the one of the SSS symbol or the DMRS symbol, and an interpolation of the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the PBCH is configured to be demodulated based at least in part on: a determination of a channel estimation for the PSS symbol, and a determination of the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the PBCH is configured to be demodulated based at least in part on: a determination of a channel estimation for the DMRS symbol or the SSS symbol, and a determination of the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, a frequency offset for the PBCH symbol is configured to be determined based at least in part on measurement of one or more of the PSS symbol, the SSS symbol, or the DMRS symbol.

In some aspects, a base station for wireless communication includes a memory; and one or more processors operatively coupled to the memory, the memory and the one or more processors configured to: configure a synchronization signal block (SSB) with time division multiplexed symbols that include a physical broadcast channel (PBCH) symbol and one or more of a primary synchronization signal (PSS) symbol, a secondary synchronization signal (SSS) symbol, or a demodulation reference signal (DMRS) symbol; transmit the SSB via a single carrier communication, wherein the PBCH is configured to be demodulated using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the PBCH is configured to be demodulated based at least in part on: a determination of a first channel estimation for the DMRS symbol, a determination of a second channel estimation for the SSS symbol, and an interpolation of the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the PBCH is configured to be demodulated based at least in part on: a determination of a first channel estimation for the first SSS symbol, a determination of a second channel estimation for the second SSS symbol, and an interpolation of the channel estimation for the PBCH symbol based at least in part on the first channel estimation and the second channel estimation.

In some aspects, the SSB indicates a cell ID associated with the SSB based at least in part on a sequence in the first SSS symbol, or wherein the SSB indicates a cell based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the PBCH is configured to be demodulated based at least in part on: a determination of a first channel estimation for the PSS symbol, a determination of a second channel estimation for the one of the SSS symbol or the DMRS symbol, and an interpolation of the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the PBCH is configured to be demodulated based at least in part on: a determination of a channel estimation for the PSS symbol, and a determination of the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the PBCH is configured to be demodulated based at least in part on: a determination of a channel estimation for the DMRS symbol or the SSS symbol, and a determination of the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, a frequency offset for the PBCH symbol is configured to be determined based at least in part on measurement of one or more of the PSS symbol, the SSS symbol, or the DMRS symbol.

In some aspects, a non-transitory computer-readable medium storing a set of instructions for wireless communication includes one or more instructions that, when executed by one or more processors of a base station, cause the base station to: configure an SSB with time division multiplexed symbols that include a PBCH symbol and one or more of a PSS symbol, an SSS symbol, or a DMRS symbol; transmit the SSB via a single carrier communication, wherein the PBCH is configured to be demodulated using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the PBCH is configured to be demodulated based at least in part on: a determination of a first channel estimation for the DMRS symbol, a determination of a second channel estimation for the SSS symbol, and an interpolation of the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the PBCH is configured to be demodulated based at least in part on: a determination of a first channel estimation for the first SSS symbol, a determination of a second channel estimation for the second SSS symbol, and an interpolation of the channel estimation for the PBCH symbol based at least in part on the first channel estimation and the second channel estimation.

In some aspects, the SSB indicates a cell ID associated with the SSB based at least in part on a sequence in the first SSS symbol, or wherein the SSB indicates a cell based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the PBCH is configured to be demodulated based at least in part on: a determination of a first channel estimation for the PSS symbol, a determination of a second channel estimation for the one of the SSS symbol or the DMRS symbol, and an interpolation of the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the PBCH is configured to be demodulated based at least in part on: a determination of a channel estimation for the PSS symbol, and a determination of the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the PBCH is configured to be demodulated based at least in part on: a determination of a channel estimation for the DMRS symbol or the SSS symbol, and a determination of the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, a frequency offset for the PBCH symbol is configured to be determined based at least in part on measurement of one or more of the PSS symbol, the SSS symbol, or the DMRS symbol.

In some aspects, an apparatus for wireless communication includes means for configuring an SSB with time division multiplexed symbols that include a PBCH symbol and one or more of a PSS symbol, an SSS symbol, or a DMRS symbol; means for transmitting the SSB via a single carrier communication, wherein the PBCH is configured to be demodulated using a channel estimation for the PBCH symbol that is based at least in part on one or more channel estimations of the PSS symbol, the SSS symbol, or the DMRS symbol.

In some aspects, the SSB includes the PBCH symbol, the DMRS symbol, and the SSS symbol, wherein the PBCH symbol is between the DMRS symbol and the SSS symbol in time, and wherein the PBCH is configured to be demodulated based at least in part on: a determination of a first channel estimation for the DMRS symbol, a determination of a second channel estimation for the SSS symbol, and an interpolation of the channel estimation for the PBCH symbol based at least in part on the first channel estimation and the second channel estimation.

In some aspects, the SSB includes the PBCH symbol, a first SSS symbol, and a second SSS symbol, wherein the PBCH symbol is between the first SSS symbol and the second SSS symbol in time, and wherein the PBCH is configured to be demodulated based at least in part on: a determination of a first channel estimation for the first SSS symbol, a determination of a second channel estimation for the second SSS symbol, and an interpolation of the channel estimation for the PBCH symbol based at least in part on the first channel estimation and the second channel estimation.

In some aspects, the SSB indicates a cell ID associated with the SSB based at least in part on a sequence in the first SSS symbol, or wherein the SSB indicates a cell based at least in part on a first sequence detected in the first SSS symbol and a second sequence detected in the second SSS symbol.

In some aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the PBCH is configured to be demodulated based at least in part on: a determination of a first channel estimation for the PSS symbol, a determination of a second channel estimation for the one of the SSS symbol or the DMRS symbol, and an interpolation of the channel estimation for the PBCH symbol based at least in part on the first channel estimation and the second channel estimation.

In some aspects, the SSB includes the PBCH symbol and the PSS symbol, wherein the PSS symbol is adjacent to the PBCH symbol in time, and wherein the PBCH is configured to be demodulated based at least in part on: a determination of a channel estimation for the PSS symbol, and a determination of the channel estimation for the PBCH symbol based at least in part on the channel estimation for the PSS symbol.

In some aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the PBCH is configured to be demodulated based at least in part on: a determination of a channel estimation for the DMRS symbol or the SSS symbol, and a determination of the channel estimation for the PBCH symbol based at least in part on the channel estimation for the DMRS symbol or the SSS symbol.

In some aspects, the PBCH is after, in time, all of the one or more of the PSS symbol, the SSS symbol, or the DMRS symbol within the SSB.

In some aspects, one more reference signals, of the one or more of the PSS, the SSS, or the DMRS, that are used to determine the channel estimation for the PBCH symbol have a same bandwidth as the PBCH.

In some aspects, the SSB indicates an SSB index based at least in part on: a sequence of one or more of the PSS symbol or the SSS symbol, or an indication within the PBCH symbol.

In some aspects, the SSB includes a beam switching gap after the PBCH and the one or more of the PSS symbol, the SSS symbol, or the DMRS symbol.

In some aspects, a frequency offset for the PBCH symbol is configured to be determined based at least in part on measurement of one or more of the PSS symbol, the SSS symbol, or the DMRS symbol.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
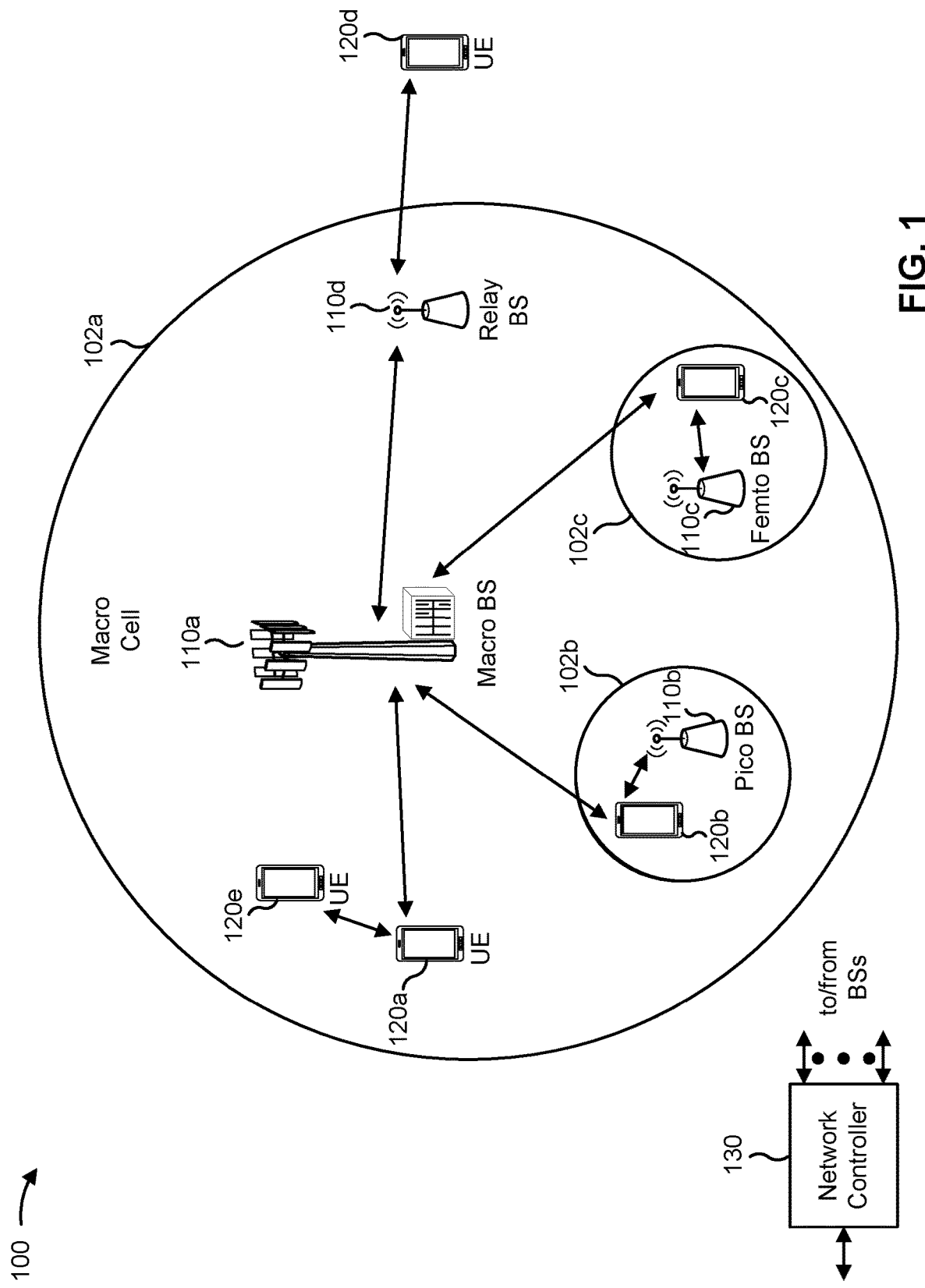
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
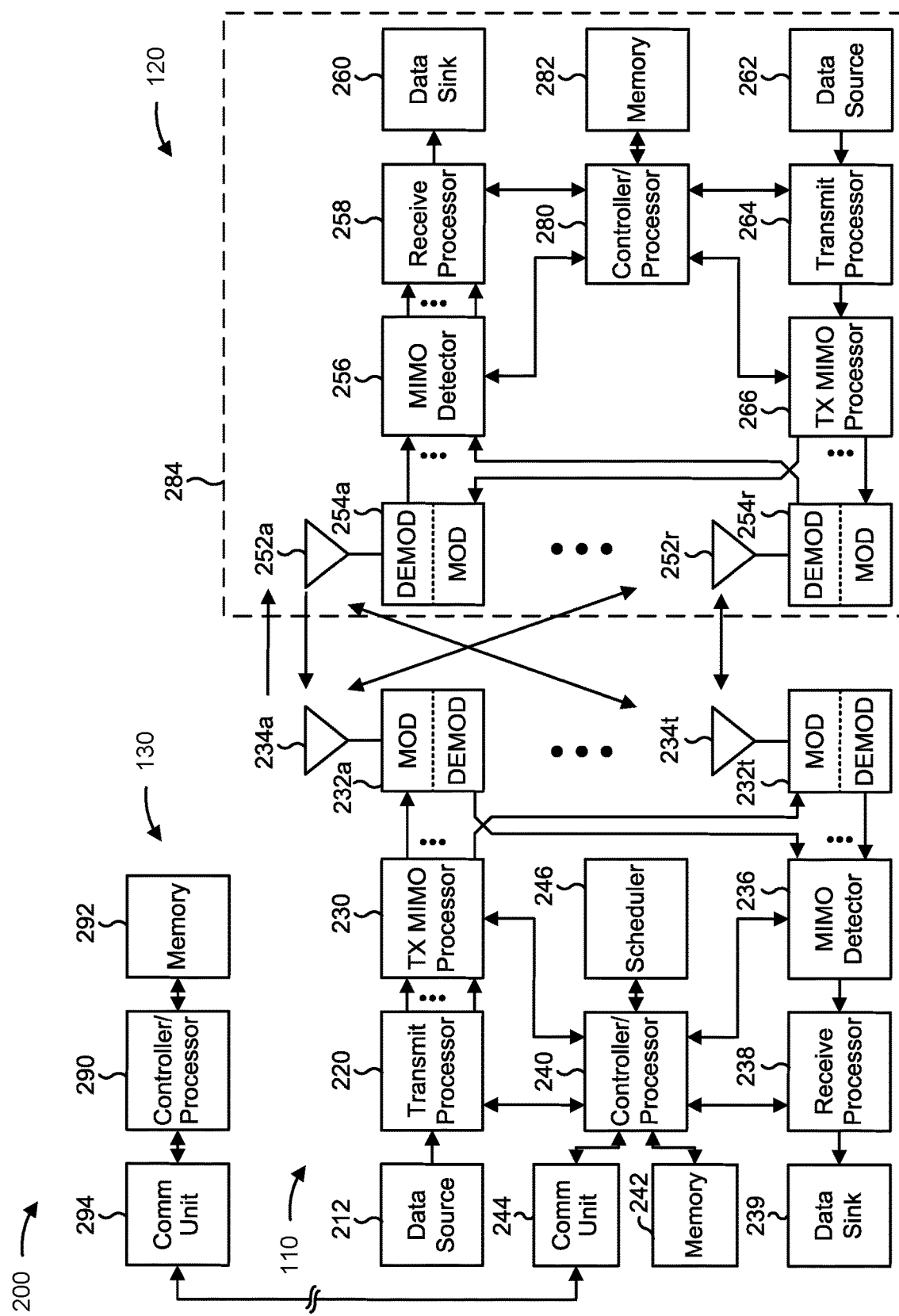
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with techniques for determining a channel estimation for a physical broadcast channel symbol of a synchronization signal block with time division multiplexed symbols, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions.

In some aspects, the UE includes means for receiving, via a single carrier communication, a synchronization signal block (SSB) with time division multiplexed symbols that include a physical broadcast channel (PBCH) symbol and one or more of a primary synchronization signal (PSS) symbol, a secondary synchronization signal (SSS) symbol, or a demodulation reference signal (DMRS) symbol; or means for demodulating the PBCH symbol using a channel estimation for the PBCH symbol that is based at least in part on one or more channel estimations of the PSS symbol, the SSS symbol, or the DMRS symbol. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a first channel estimation for the DMRS symbol, means for determining a second channel estimation for the SSS symbol, and means for interpolating the channel estimation for the PBCH symbol based at least in part on the first channel estimation and the second channel estimation.

In some aspects, the UE includes means for determining a first channel estimation for the first SSS symbol, means for determining a second channel estimation for the second SSS symbol, and means for interpolating the channel estimation for the PBCH symbol based at least in part on the first channel estimation and the second channel estimation.

In some aspects, the UE includes means for determining a cell identification (ID) associated with the SSB based at least in part on a sequence detected in the first SSS symbol, or means for determining a cell ID associated with the SSB based at least in part on a first sequence detected in the first SSS symbol and a second sequence detected in the second SSS symbol.

In some aspects, the UE includes means for determining a first channel estimation for the PSS symbol, means for determining a second channel estimation for the one of the SSS symbol or the DMRS symbol, and means for interpolating the channel estimation for the PBCH symbol based at least in part on the first channel estimation and the second channel estimation.

In some aspects, the UE includes means for determining a channel estimation for the PSS symbol, and means for determining the channel estimation for the PBCH symbol based at least in part on the channel estimation for the PSS symbol.

In some aspects, the UE includes means for determining a channel estimation for the DMRS symbol or the SSS symbol, and means for determining the channel estimation for the PBCH symbol based at least in part on the channel estimation for the DMRS symbol or the SSS symbol.

In some aspects, the UE includes means for determining a frequency offset for the PBCH symbol based at least in part on measurement of one or more of the PSS symbol, the SSS symbol, or the DMRS symbol.

In some aspects, the base station includes means for configuring an SSB with time division multiplexed symbols that include a PBCH symbol and one or more of a PSS symbol, an SSS symbol, or a DMRS symbol; means for transmitting the SSB via a single carrier communication, wherein the PBCH is configured to be demodulated using a channel estimation for the PBCH symbol that is based at least in part on one or more channel estimations of the PSS symbol, the SSS symbol, or the DMRS symbol. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Figure 3:
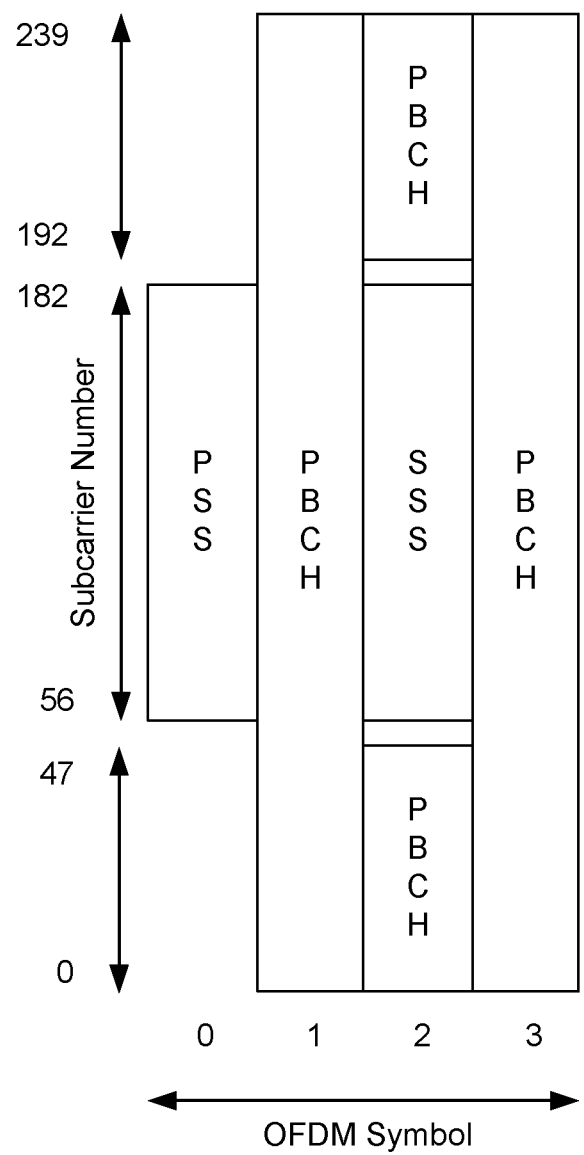
FIG. 3 is a diagram illustrating an example of a system information block, in accordance with various aspects of the present disclosure.

FIG. 3 is a diagram illustrating an example 300 of a system information block, in accordance with various aspects of the present disclosure. As shown in FIG. 3, an SSB may include a PSS, an SSS, and one or more PBCHs.

The SSB may span 4 OFDM symbols with 1 symbol for the PSS, 2 symbols for PBCH, and 1 symbol that includes an SSS frequency division multiplexed with a PBCH. Subcarrier spacing (SCS) for the SSB may depend on a frequency range of the SSB. For example, for an SSB in FR1, SCS may be 15 kilohertz (kHz) or 30 kHz, among other examples. For an SSB in FR2, SCS may be 120 kHz or 240 kHz, among other examples.

The PSS may use a length of 127 subcarriers (e.g., subcarriers 56 to 182) to indicate frequency domain-based M-sequences (e.g., mapped to 127 subcarriers). The PSS may have 3 possible sequences. The SSS may use a length of 127 subcarriers (e.g., subcarriers 56 to 182) to indicate a frequency domain-based Gold Code sequence (2 M-sequences mapped to 127 subcarriers). The SSS may have 336 possible sequences. The SSS and PSS may have a total of 1008 possible combined sequences.

The PSS may have an unknown timing and/or frequency. During an initial search, a UE may use a sliding window and correlation technique to look for the PSS. For each timing hypotheses, the UE may attempt to use all 3 possible sequences and N frequency hypotheses to account for doppler, internal clock frequency shifts, and/or frequency errors, among other examples. Once the UE detects the PSS, the UE may determine symbol timing, an initial frequency offset estimation, and a part of a cell ID (e.g., cell ID part 2 with 1 of 3 possible values).

The UE may detect the SSS using a timing and/or frequency determined from the PSS. From the SSS, the UE may determine another part of the cell ID (e.g., cell ID part 1 with 1 of 336 possible values). The UE may determine the cell ID based at least in part on the part of the cell ID indicated by the PSS and the part of the cell ID indicated by the SSS (e.g., 3× cell ID part 1+cell ID part 2). Additionally, or alternatively, based at least in part on determining the 2 M sequences (the Gold code) of the SSS, the UE may determine cyclic shifts of the SSB.

The UE may detect the PBCH using the timing and/or frequency determined from the PSS. The PBCH may include a master information block (MIB) (e.g., higher layer radio resource control signaling), which may be multiplexed and/or encoded. The PBCH may be quadrature phase-shift key (QPSK) modulated and may be coherently demodulated using DMRS that are transmitted with the PBCH (e.g., frequency domain multiplexed with data of the PBCH).

The DMRSs may be interleaved on resource elements with PBCH data (e.g., on every further subcarrier). The UE may use the DMRSs to estimate a channel for a symbol that includes the PBCH. The estimate for the channel may be used to demodulate the PBCH data. Additionally, or alternatively, the DMRSs may include 3 least significant bits (LSBs) of an SSB index per half-frame based at least in part on a DMRS sequence index associated with the DMRSs.

As indicated above, FIG. 3 is provided as an example. Other examples may differ from what is described with regard to FIG. 3.

In some wireless networks, such as wireless networks that operate using relatively high frequency bands (e.g., greater than 100 GHz), an SSB as described in FIG. 3 may present difficulties. For example, communications using the relatively high frequency bands may have relatively high phase noise, which may require a relatively large SCS. A relatively large SCS may cause symbols to be relatively short (e.g., based at least in part on SCS and symbol lengths being inversely correlated). A relatively short symbol may require a receiving device (e.g., a UE) to perform fast Fourier transforms (FFTs) on a received signal in a relatively short amount of time. The amount of time may be insufficient for the receiving device, which may cause communication errors.

To improve communications for wireless networks that operate using relatively high frequency bands, the wireless networks may use single carrier frequency domain (FD) communications (e.g., direct Fourier transform spread OFDM (DFT-s-OFDM) communications). The single carrier FD communications may improve peak-to-average-power of communications (e.g., to improve coverage), may be received with single tap frequency domain equalization, and/or may reduce and/or eliminate a need for a guard band (e.g., to improve bandwidth utilization), among other improvements. However, the single carrier FD communications may prohibit an SSB from using frequency division multiplexing to provide DMRSs with a PBCH. This may impair channel estimation for the PBCH, which may consume power, computing, and/or communication resources of the UE based at least in part on the UE failing to correctly demodulate the PBCH.

In some aspects described herein, a base station of a wireless network may transmit, and a UE may receive, an SSB with time division multiplexed symbols that include a PBCH symbol and a PSS symbol, an SSS symbol, and/or a DMRS symbol. The UE may perform channel estimations of the PSS symbol, the SSS symbol, and/or the DMRS symbol and then use the channel estimations of the PSS symbol, the SSS symbol, and/or the DMRS symbol to determine a channel estimation for the PBCH symbol. For example, the UE may interpolate from two or more of the PSS symbol, the SSS symbol, and/or the DMRS symbol to determine the channel estimation for the PBCH symbol. In some aspects, the UE may extrapolate from one or more of the PSS symbol, the SSS symbol, and/or the DMRS symbol to determine the channel estimation for the PBCH symbol. In some aspects, the UE may refine a channel estimation based at least in part on a DMRS symbol of a subsequent reference signal (e.g., to refine a frequency offset estimation for the channel estimation).

Based at least in part on the UE using the channel estimations of the PSS symbol, the SSS symbol, and/or the DMRS symbol to determine a channel estimation for the PBCH symbol, the UE may improve demodulation of the PBCH symbol (e.g., when the PBCH symbol does not include DMRSs), which may conserve power, computing, and/or communication resources of the UE that may have otherwise been used based at least in part on the UE failing to correctly demodulate the PBCH.

Figure 4:
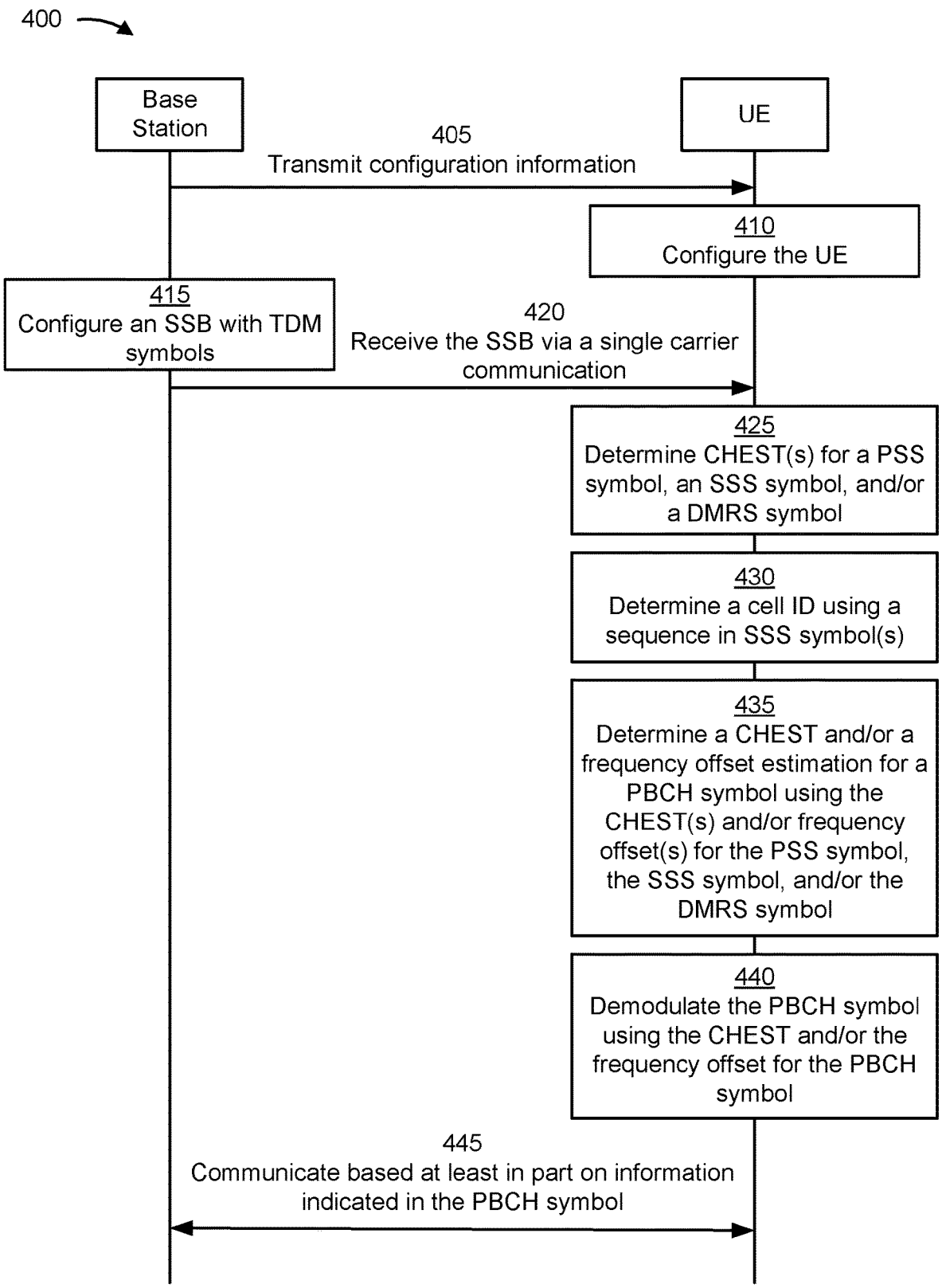
FIGS. 4-5H are diagrams illustrating examples associated with techniques for determining a channel estimation for a physical broadcast channel symbol of a synchronization signal block with time division multiplexed symbols, in accordance with various aspects of the present disclosure.

FIG. 4 is a diagram illustrating an example 400 associated with techniques for determining a channel estimation for a PBCH symbol of an SSB with time division multiplexed symbols, in accordance with various aspects of the present disclosure. As shown in FIG. 4, a UE (e.g., UE 120) may communicate with a base station (e.g., base station 110). The UE and the base station may be part of a wireless network (e.g., wireless network 100). In some aspects, the UE and the base station may be configured to communicate using a relatively high frequency band (e.g., above 60 GHz and/or above 100 GHz, among other examples).

As shown by reference number 405, the base station may transmit, and the UE may receive, configuration information. In some aspects, the UE may receive configuration information from another device (e.g., from another base station and/or another UE) and/or a communication standard, among other examples. In some aspects, the UE may receive the configuration information via one or more of radio resource control (RRC) signaling, medium access control (MAC) control element (CE) signaling, or downlink control information (DCI) signaling, and/or the UE may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to receive an SSB (e.g., from the base station or another base station) via a single carrier communication. In some aspects, the configuration information may indicate that the UE is to determine a channel estimation for a PBCH symbol of the SSB based at least in part on one or more channel estimations of one or more other symbols of the SSB. For example, the configuration information may indicate that the UE is to determine the channel estimation of the PBCH symbol based at least in part on a determination of a channel estimation of one or more of a PSS, an SSS, and/or a DMRS of the SSB.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the base station may configure an SSB with time division multiplexed symbols that include a PBCH symbol and a PSS symbol, an SSS symbol, and/or a DMRS symbol. In some aspects, the base station may configure the SSB with a gap (e.g., for beam switching) at an end of the SSB (e.g., after, in time, the PBCH symbol and the PSS symbol, the SSS symbol and/or the DMRS symbol. In some aspects, the base station may configure an order of the symbols of the SSB to facilitate interpolation, extrapolation, and/or other techniques for estimating a channel of the PBCH symbol without using DMRSs in the PBCH symbol. For example, the base station may configure the order of the symbols to position the PBCH between one of the PSS symbol, the SSS symbol, or the DMRS symbol and another of the PSS symbol, the SSS symbol, or the DMRS symbol. In some aspects, the base station may position the PBCH immediately before the gap so the gap may be absorbed into the PBCH.

As shown by reference number 420, the UE may receive, and the base station may transmit, the SSB via a single carrier communication (e.g., with time division multiplexed symbols). In some aspects, the base station may transmit the SSB to multiple UEs using a transmit beam of the base station. In some aspects, the base station may transmit additional SSBs using additional transmit beams of the base station. In some aspects, the additional SSBs may include characteristics similar to characteristics of the SSB described herein.

In some aspects, the SSB may include the PBCH symbol, the DMRS symbol, and the SSS symbol. The PBCH symbol may be between the DMRS symbol and the SSS symbol in time. In this way, the UE may interpolate a channel estimation for the PBCH symbol based at least in part on a channel estimation of the DMRS symbol and a channel estimation of the SSS symbol.

In some aspects, the SSB may include the PBCH symbol, a first SSS symbol, and a second SSS symbol. The PBCH symbol may be between the first SSS symbol and the second SSS symbol in time. In this way, the UE may interpolate a channel estimation for the PBCH symbol based at least in part on a channel estimation of the a first SSS symbol, and a channel estimation of the second SSS symbol.

In some aspects, the SSB may include the PBCH symbol, the PSS symbol, and the SSS symbol. The PBCH symbol may be between the PSS symbol and the SSS symbol in time. In this way, the UE may interpolate a channel estimation for the PBCH symbol based at least in part on a channel estimation of the PSS symbol and a channel estimation of the SSS symbol.

In some aspects, the SSB may include the PBCH symbol, the DMRS symbol, and the PSS symbol. The PBCH symbol may be between the DMRS symbol and the PSS symbol in time. In this way, the UE may interpolate a channel estimation for the PBCH symbol based at least in part on a channel estimation of the DMRS symbol and a channel estimation of the PSS symbol.

In some aspects, the SSB may include the PBCH symbol and the PSS symbol. The PBCH symbol may be adjacent to the PSS symbol in time. In this way, the UE may determine (e.g., extrapolate) a channel estimation for the PBCH symbol using a channel estimation of the PSS symbol.

In some aspects, the SSB may include the PBCH symbol, the PSS symbol, and the SSS symbol. The SSS symbol may be between the PBCH symbol and the PSS symbol in time. In this way, the UE may determine (e.g., extrapolate) a channel estimation for the PBCH symbol based at least in part on a channel estimation of the SSS symbol.

In some aspects, the SSB may include the PBCH symbol, the PSS symbol, and the DMRS symbol. The DMRS symbol may be between the PBCH symbol and the PSS symbol in time. In this way, the UE may determine (e.g., extrapolate) a channel estimation for the PBCH symbol based at least in part on a channel estimation of the DMRS symbol.

As shown by reference number 425, the UE may determine one or more channel estimations (CHESTs) for the PSS symbol, the SSS symbol, and/or the DMRS symbol. In some aspects, the UE may determine a matrix, based at least in part on the channel estimations, to multiply with incoming signals to correct for channel conditions. In some aspects, the UE may use one or more known sequences associated with the PSS symbol, the SSS symbol, and/or the DMRS symbol to determine the one or more channel estimations.

In some aspects, the UE may determine a channel estimation of the DMRS symbol using a known DMRS sequence. In some aspects, the UE may determine a channel estimation of the SSS symbol after detecting an SSS sequence (e.g., used to carry SSS information such as a part of a cell ID). In some aspects, the UE may determine a channel estimation of the PSS symbol after detecting a PSS sequence (e.g., used to carry SSS information such as a part of a cell ID). In some aspects, the UE may determine a first channel estimation for one of the PSS symbol, the SSS symbol, and/or the DMRS symbol and a second channel estimation for another of the PSS symbol, the SSS symbol, and/or the DMRS symbol.

As shown by reference number 430, the UE may determine a cell ID using a sequence in one or more SSS symbols. In some aspects, the UE may determine a cell ID associated with the SSB based at least in part on a sequence in a first SSS symbol. The UE may apply the sequence in the first SSS symbol to a second SSS symbol. Alternatively, the UE may determine a cell ID associated with the SSB based at least in part on a first sequence detected in the first SSS symbol and a second sequence detected in the second SSS symbol. In this way, the first SSS symbol and the second SSS symbol may carry different sequences that may be combined to determine a cell ID.

As shown by reference number 435, the UE may determine a channel estimation and/or a frequency offset for the PBCH symbol using the one or more channel estimation and/or one or more frequency offsets for the PSS symbol, the SSS symbol, and/or the DMRS symbol. In some aspects, the UE may determine the channel estimation and/or the frequency offset for the PBCH symbol based at least in part on interpolating the channel estimation for the PBCH symbol based at least in part on a first channel estimation associated with a first symbol (e.g., a PSS symbol, an SSS symbol, or a DMRS symbol) and a second channel estimation associated with a second symbol (e.g., a PSS symbol, an SSS symbol, or a DMRS symbol). In some aspects, the PBCH may be positioned, in time, between the first symbol and the second symbol.

In some aspects, the UE may determine the channel estimation and/or the frequency offset for the PBCH symbol based at least in part on extrapolating the channel estimation for the PBCH symbol based at least in part on a channel estimation associated with another symbol (e.g., a PSS symbol, an SSS symbol, or a DMRS symbol). In some aspects, the other symbol may be adjacent to (e.g., before) the PBCH symbol in time.

As shown by reference number 440, the UE may demodulate the PBCH symbol using the channel estimation and/or the frequency offsets for the PBCH symbol. In some aspects, the UE may demodulate the PBCH symbol using a channel estimation for the PBCH symbol that is based at least in part on one or more channel estimations of the PSS symbol, the SSS symbol, or the DMRS symbol.

As shown by reference number 445, the UE and the base station may communicate based at least in part on information indicated in the PBCH symbol. For example, the UE may receive one or more system information blocks based at least in part on information indicated in the PBCH symbol, and/or may transmit a random access channel message to attempt to access a cell of the base station, among other examples.

Based at least in part on the UE using the channel estimations of the PSS symbol, the SSS symbol, and/or the DMRS symbol to determine a channel estimation for the PBCH symbol, the UE may improve demodulation of the PBCH symbol (e.g., when the PBCH symbol does not include DMRSs), which may conserve power, computing, and/or communication resources of the UE that may have otherwise been used based at least in part on the UE failing to correctly demodulate the PBCH.

As indicated above, FIG. 4 is provided as an example. Other examples may differ from what is described with regard to FIG. 4.

FIGS. 5A-5H are diagrams illustrating examples associated with techniques for determining a channel estimation for a PBCH symbol of an SSB with time division multiplexed symbols, in accordance with various aspects of the present disclosure. As shown by FIGS. 5A-5H, an SSB may include one or more symbols including a PBCH and a PSS, an SSS, and/or a DMRS. In some aspects, the SSB may be configured with a gap (e.g., a beam switching gap) after the PBCH, the PSS, the SSS and/or the DMRS.

Figure 5A:
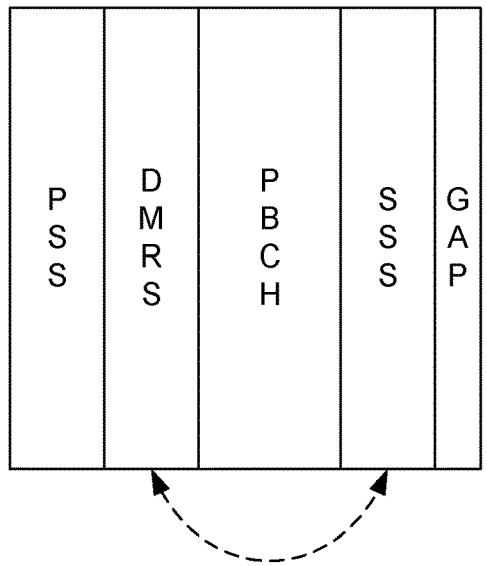

As shown by FIG. 5A, example 500A illustrates an SSB that includes a PSS symbol, a DMRS symbol, a PBCH symbol, and an SSS symbol. The SSB may further include a gap after the SSS symbol. As shown by example 500A, the UE may perform channel estimation for the PBCH based at least in part on time domain interpolation of a channel estimation of the DMRS symbol and the SSS symbol. Additionally, or alternatively, the UE may perform a frequency offset estimation based at least in part on a frequency offset estimation of the DMRS symbol and a frequency offset estimation of the SSS symbol.

In some aspects, the UE may use a known DMRS sequence of the DMRS symbol to determine the channel estimation of the DMRS symbol. The UE may detect a sequence of the SSS symbol and then use the detected sequence of the SSS symbol to determine the channel estimation of the SSS symbol. In some aspects, the UE may determine the sequence of the SSS symbol from a relatively large number (e.g., 336) of possible SSS sequences.

The UE may further determine a cell ID based at least in part on the sequence of the SSS symbol and a detected sequence of the PSS symbol.

In some aspects, an order of symbols shown in FIG. 5A may be rearranged. For example, the DMRS symbol may be switched with the SSS symbol.

Figure 5B:
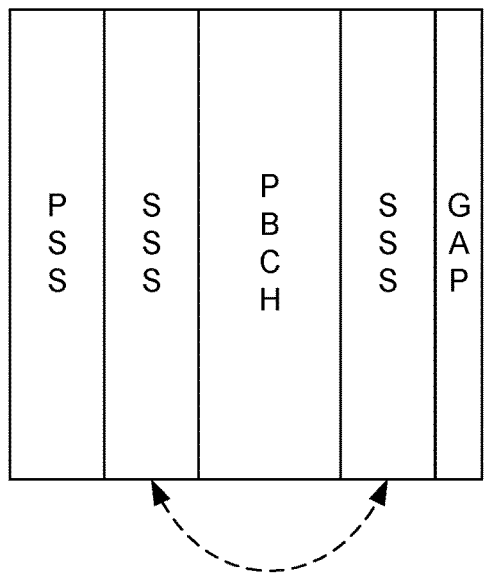

As shown by FIG. 5B, example 500B illustrates an SSB that includes a PSS symbol, a first SSS symbol, a PBCH symbol, and a second SSS symbol. The SSB may further include a gap after the second SSS symbol. As shown by example 500B, the UE may perform channel estimation for the PBCH based at least in part on time domain interpolation of a channel estimation of the first SSS symbol and the second SSS symbol. Additionally, or alternatively, the UE may perform a frequency offset estimation based at least in part on a frequency offset estimation of the first symbol and a frequency offset estimation of the second SSS symbol.

In some aspects, the first SSS symbol and the second SSS symbol may include a same SSS sequence from a relatively large number (e.g., 336) of possible SSS sequences. The UE may detect a sequence of the first SSS symbol and the second SSS symbol (e.g., a same sequence) and then use the detected sequence of the first SSS symbol and the second SSS symbol to determine the channel estimation of the first SSS symbol and the channel estimation of the second SSS symbol. In some aspects, the UE may determine the sequence of the SSS symbols from a relatively large number (e.g., 336) of possible SSS sequences. Detection of the sequence of the first SSS symbol may be complex (e.g., using a relatively large number of possible sequences) and detection of the same sequence within the second SSS symbol may be simple (e.g., based at least in part on already detecting the sequence in the first SSS symbol).

The UE may further determine a cell ID based at least in part on the sequence of the first SSS symbol and a detected sequence of the PSS symbol.

As shown in example 500B, the SSB may omit DMRSs. Based at least in part on the SSB omitting DMRSs, the SSB may communicate LSBs of an SSB index per half frame using a PSS sequence, an SSS sequence, or information within the PBCH symbol. For example, the SSB may indicate the LSBs of the SSB index based at least in part on increasing a number of possible PSS and/or SSS sequences to account for the LSBs. Alternatively, the SSB may indicate the LSBs in an MIB of the PBCH and/or via multiplexing with the PBCH in layer 1 information of the PBCH.

Figure 5C:
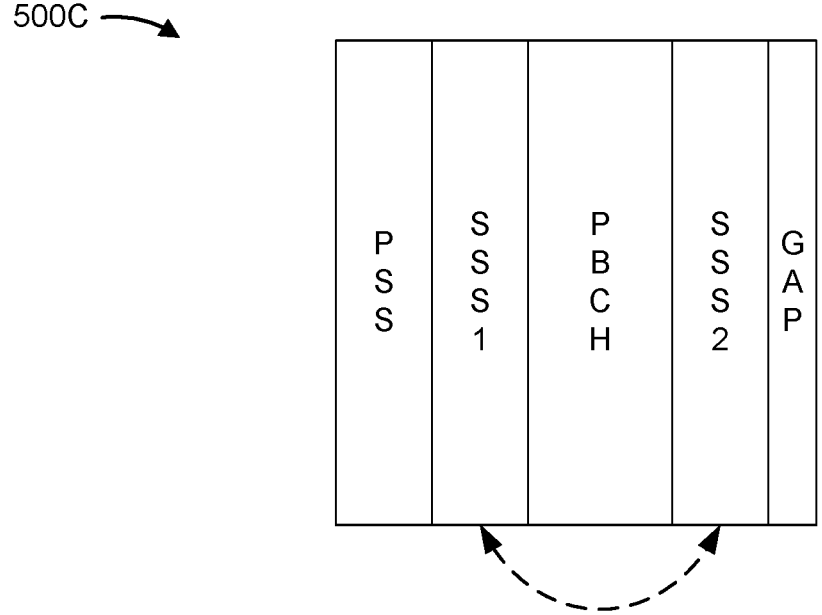

As shown by FIG. 5C, example 500C illustrates an SSB that includes a PSS symbol, a first SSS symbol, a PBCH symbol, and a second SSS symbol. The SSB may further include a gap after the second SSS symbol. As shown by example 500C, the UE may perform channel estimation for the PBCH based at least in part on time domain interpolation of a channel estimation of the first SSS symbol and the second SSS symbol. Additionally, or alternatively, the UE may perform a frequency offset estimation based at least in part on a frequency offset estimation of the first symbol and a frequency offset estimation of the second SSS symbol.

In some aspects, the first SSS symbol may include a first SSS sequence and the second SSS symbol may include a second SSS sequence. In some aspects, the first SSS sequence may indicate a first portion of a cell ID (e.g., a first portion of a cell ID part 1), and the second sequence may indicate a second portion of the cell ID (e.g., a second portion of a cell ID part 1). In some aspects, each of the first SSS sequence and the second SSS sequence may have a reduced complexity based at least in part on including only a portion of a cell ID part 1. For example, to indicate one cell ID part 1 of 336 possible cell IDs, the first SSS sequence may indicate one of 24 possible first parts of the cell ID part 1 and the second SSS sequence may indicate one of 14 possible second parts of the cell ID part 1. In this way, detection complexity for the first SSS symbol may be reduced. This may conserve computing and/or power resources of the UE that may otherwise have been used to attempt to detect the cell ID part 1 by detecting an SSS sequence from 336 possible SSS sequences of the first SSS symbol.

Figure 5D:
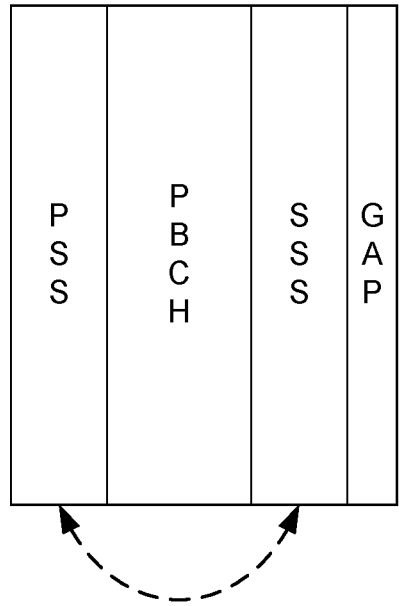

As shown by FIG. 5D, example 500D illustrates an SSB that includes a PSS symbol, a PBCH symbol, and an SSS symbol. The SSB may not include a DMRS symbol (e.g., the DMRS symbol may be unnecessary for determining a channel estimation for the PBCH symbol). The SSB may further include a gap after the SSS symbol. As shown by example 500D, the UE may perform channel estimation for the PBCH based at least in part on time domain interpolation of a channel estimation of the PSS symbol and the SSS symbol. Additionally, or alternatively, the UE may perform a frequency offset estimation based at least in part on a frequency offset estimation of the PSS symbol and a frequency offset estimation of the SSS symbol.

In some aspects, the UE may detect a PSS sequence of the PSS symbol and then use the detected sequence of the PSS symbol to determine the channel estimation of the PSS symbol. The UE may detect a sequence of the SSS symbol and then use the detected sequence of the SSS symbol to determine the channel estimation of the SSS symbol.

The UE may further determine a cell ID based at least in part on the sequence of the SSS symbol and a detected sequence of the PSS symbol.

Figure 5E:
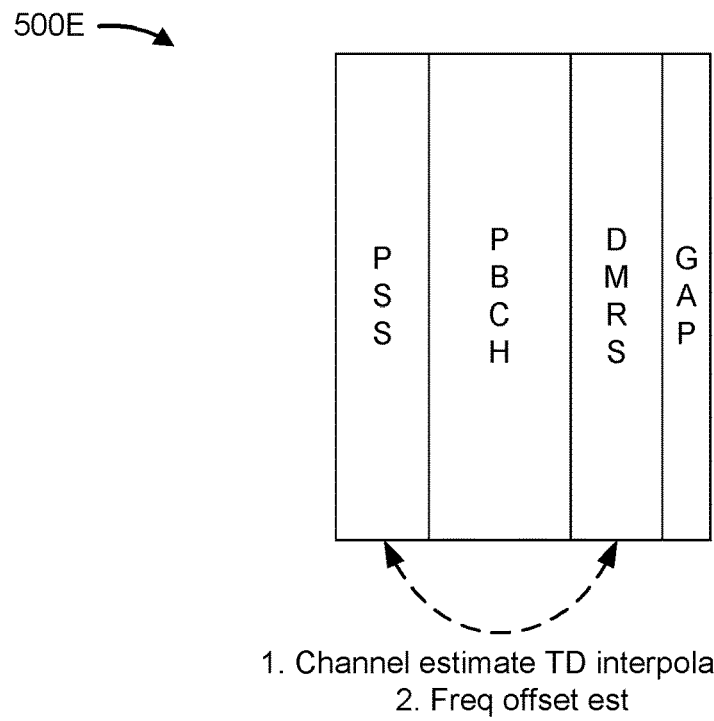

As shown by FIG. 5E, example 500E illustrates an SSB that includes a PSS symbol, a PBCH symbol, and a DMRS symbol. The SSB may further include a gap after the SSS symbol. As shown by example 500E, the UE may perform channel estimation for the PBCH based at least in part on time domain interpolation of a channel estimation of the PSS symbol and the DMRS symbol. Additionally, or alternatively, the UE may perform a frequency offset estimation based at least in part on a frequency offset estimation of the PSS symbol and the DMRS symbol.

As further shown by example 500E, the SSB may not include an SSS symbol. In some wireless networks operating in relatively high frequency bands, a base station may operate relatively narrow beams to communicate with one or more UEs. In these wireless networks, communications may be limited based at least in part on signal-to-noise ratios (e.g., transmission power and/or power loss limitations) rather than signal-to-interference-plus-noise ratios (e.g., limitations based at least in part on interference from other communications). These wireless networks may only need a relatively small number of cell IDs because the cell IDs are used to scramble messages to mitigate interference from other communications. For example, instead of using 1008 possible cell IDs, the wireless network may use 336, 128, 64, 32, 16, or 8 possible cell IDs, among other examples. A base station may indicate a cell ID from a relatively small number of cell IDs using the PSS, which may facilitate omission of an SSS from the SSB.

In some aspects, the UE may use a known DMRS sequence of the DMRS symbol to determine the channel estimation of the DMRS symbol. The UE may detect a sequence of the PSS symbol and then use the detected sequence of the PSS symbol to determine the channel estimation of the PSS symbol. In some aspects, the UE may determine the sequence of the PSS symbol from a relatively small number (e.g., 128, 64, 32, 16, or 8) of possible PSS sequences.

Figure 5F:
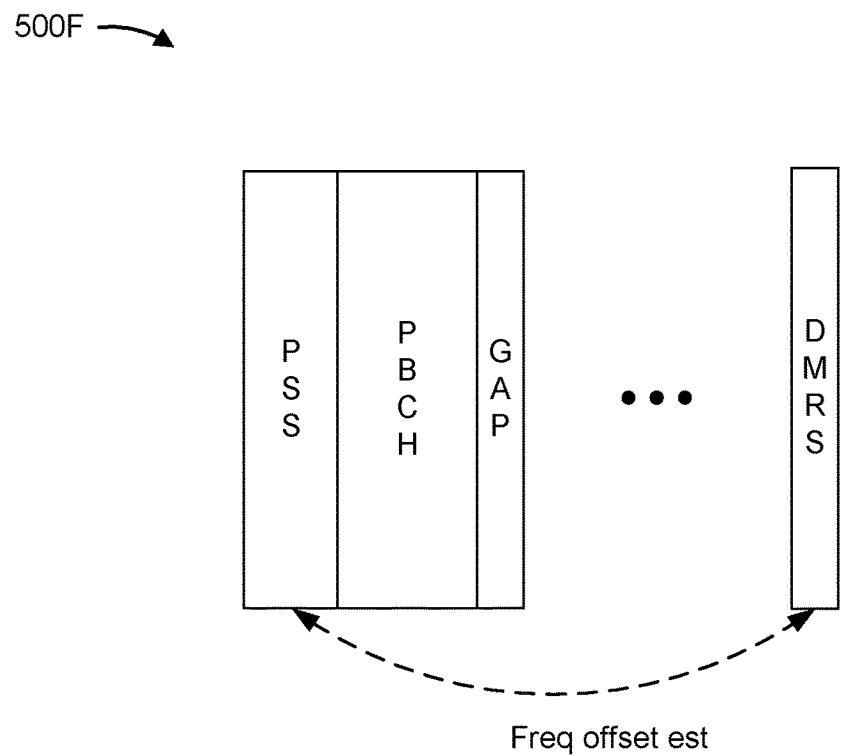

As shown by FIG. 5F, example 500F illustrates an SSB that includes a PSS symbol and a PBCH symbol. The SSB may further include a gap after the SSS symbol. The UE may perform channel estimation for the PBCH based at least in part on extrapolation of a channel estimation of the PSS symbol. Additionally, or alternatively, the UE may perform a frequency offset estimation based at least in part on a frequency offset estimation of the PSS symbol and a DMRS symbol of a subsequence reference signal.

Similar to example 500E, the SSB may not include an SSS symbol. A base station may indicate a cell ID from a relatively small number of cell IDs using the PSS, which may facilitate omission of an SSS from the SSB.

The UE may detect a sequence of the PSS symbol and then use the detected sequence of the PSS symbol to determine the channel estimation of the PSS symbol. In some aspects, the UE may determine the sequence of the PSS symbol from a relatively small number (e.g., 128, 64, 32, 16, or 8) of possible PSS sequences. The UE may refine a frequency offset estimation (e.g., used for the channel estimation of the PBCH symbol) based at least in part on a DMRS of another reference signal (e.g., a system information block or a physical downlink shared channel communication, among other examples).

Figure 5G:
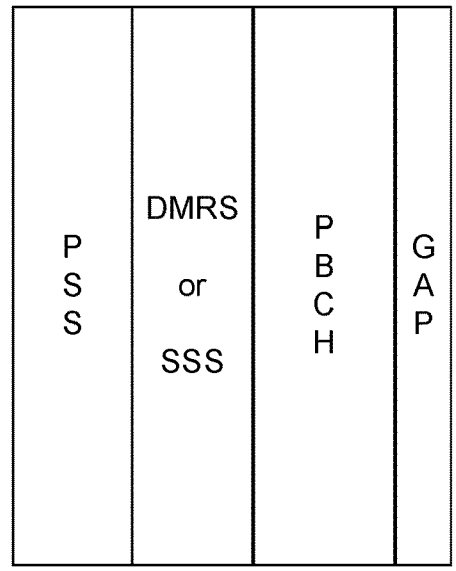

As shown by FIG. 5G, example 500G illustrates an SSB that includes a PSS symbol, one of a DMRS symbol or an SSS symbol, a PBCH symbol and a gap after the PBCH symbol. The UE may perform channel estimation for the PBCH based at least in part on extrapolation of a channel estimation of the PSS symbol and/or the one of the DMRS symbol or the SSS symbol. Additionally, or alternatively, the UE may perform a frequency offset estimation based at least in part on a frequency offset estimation of the PSS symbol and a frequency offset estimation of the one of the DMRS symbol or the SSS symbol.

Based at least in part on the PBCH symbol being after the PSS symbol and the one of the DMRS symbol or the SSS symbol, and the gap being after the PBCH symbol, the gap may be absorbed into the PBCH. In some aspects, the SSB may include one or more repetitions of PBCH data, which the base station may cease at a time to allow the base station to switch beams for transmission of an additional SSB via an additional transmit beam. In this way, the gap may have a flexible time duration based at least in part on capabilities of the base station to beam switch.

Figure 5H:
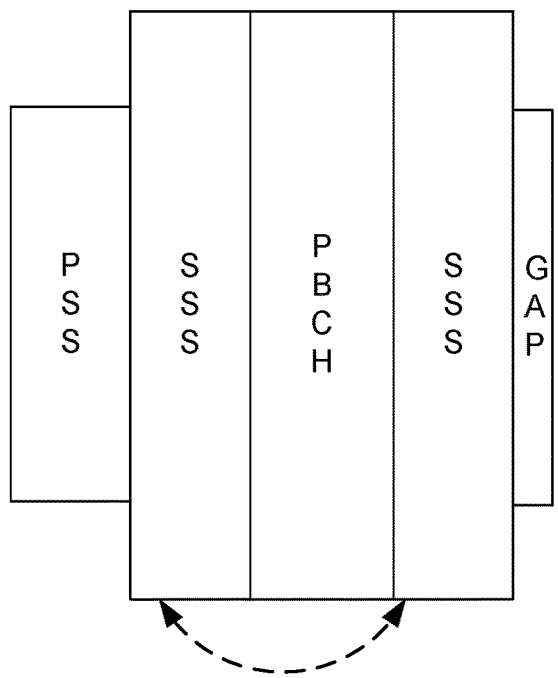

As shown by FIG. 5H, example 500H illustrates a symbol that includes a sequence to be used to determine a channel estimation of the PBCH symbol may be configured with a same bandwidth as the PBCH within the PBCH symbol. As shown by example 500E, the UE performs channel estimation for a first SSS symbol and a second SSS symbol and/or performs frequency offset estimation for the first SSS symbol and the second SSS symbol. Based at least in part on the SSB being configured (e.g., by the base station) for the PBCH to be demodulated using a channel estimation for the PBCH symbol that is based at least in part on one or more channel estimations of one or more other symbols of the SSB, the one or more other symbols of the SSB are configured with a bandwidth that is the same as a bandwidth of the SSB. As shown, the first SSS symbol and the second SSS symbol are configured with a same bandwidth as the PBCH symbol. In this way, interpolation or extrapolation from the one or more other symbols of the SSB may provide a channel estimation for the PBCH symbol with improved accuracy.

As indicated above, FIGS. 5A-5H are provided as examples. Other examples may differ from what is described with regard to FIGS. 5A-5H.

Figure 6:
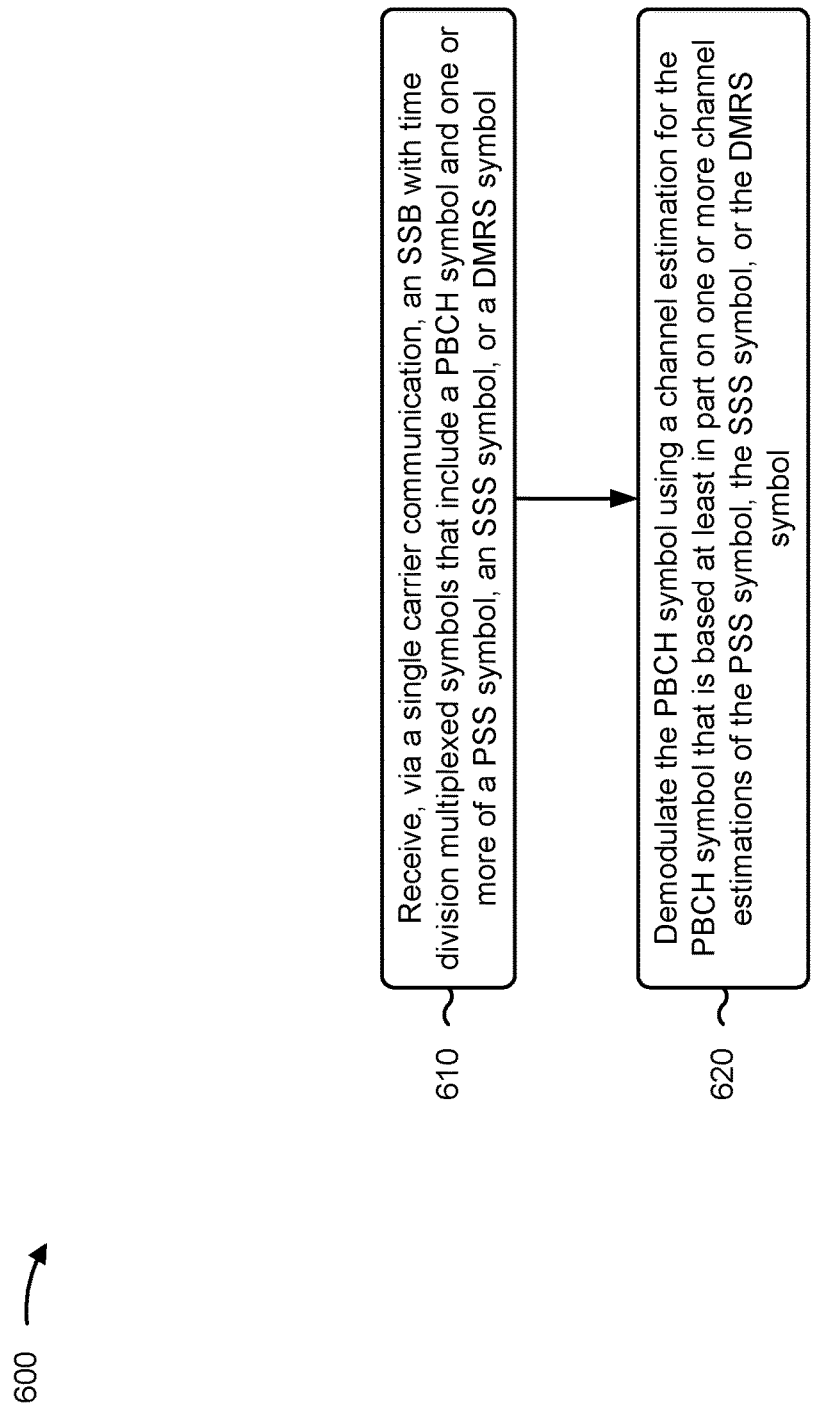
FIGS. 6 and 7 are diagrams illustrating example processes associated with techniques for determining a channel estimation for a physical broadcast channel symbol of a synchronization signal block with time division multiplexed symbols, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with techniques for determining a channel estimation for a PBCH symbol of an SSB with time division multiplexed symbols.

As shown in FIG. 6, in some aspects, process 600 may include receiving, via a single carrier communication, an SSB with time division multiplexed symbols that include a PBCH symbol and one or more of a PSS symbol, an SSS symbol, or a DMRS symbol (block 610). For example, the UE (e.g., using reception component 802, depicted in FIG. 8) may receive, via a single carrier communication, an SSB with time division multiplexed symbols that include a PBCH symbol and one or more of a PSS symbol, an SSS symbol, or a DMRS symbol, as described above.

As further shown in FIG. 6, in some aspects, process 600 may include demodulating the PBCH symbol using a channel estimation for the PBCH symbol that is based at least in part on one or more channel estimations of the PSS symbol, the SSS symbol, or the DMRS symbol (block 620). For example, the UE (e.g., using communication manager 808, depicted in FIG. 8) may demodulate the PBCH symbol using a channel estimation for the PBCH symbol that is based at least in part on one or more channel estimations of the PSS symbol, the SSS symbol, or the DMRS symbol, as described above.

Process 600 may include additional aspects, such as any single aspect or any combination of aspects described below and/or in connection with one or more other processes described elsewhere herein.

In a first aspect, the SSB includes the PBCH symbol, the DMRS symbol, and the SSS symbol, wherein the PBCH symbol is between the DMRS symbol and the SSS symbol in time, and wherein the method further comprises determining a first channel estimation for the DMRS symbol, determining a second channel estimation for the SSS symbol, and interpolating the channel estimation for the PBCH symbol based at least in part on the first channel estimation and the second channel estimation.

In a second aspect, alone or in combination with the first aspect, the SSB includes the PBCH symbol, a first SSS symbol, and a second SSS symbol, wherein the PBCH symbol is between the first SSS symbol and the second SSS symbol in time, and wherein the method further comprises determining a first channel estimation for the first SSS symbol, determining a second channel estimation for the second SSS symbol, and interpolating the channel estimation for the PBCH symbol based at least in part on the first channel estimation and the second channel estimation.

In a third aspect, alone or in combination with one or more of the first and second aspects, process 600 includes determining a cell ID associated with the SSB based at least in part on a sequence detected in the first SSS symbol, or determining a cell ID associated with the SSB based at least in part on a first sequence detected in the first SSS symbol and a second sequence detected in the second SSS symbol.

In a fourth aspect, alone or in combination with one or more of the first through third aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the method further comprises determining a first channel estimation for the PSS symbol, determining a second channel estimation for the one of the SSS symbol or the DMRS symbol, and interpolating the channel estimation for the PBCH symbol based at least in part on the first channel estimation and the second channel estimation.

In a fifth aspect, alone or in combination with one or more of the first through fourth aspects, the SSB includes the PBCH symbol and the PSS symbol, wherein the PSS symbol is adjacent to the PBCH symbol in time, and wherein the method further comprises determining a channel estimation for the PSS symbol, and determining the channel estimation for the PBCH symbol based at least in part on the channel estimation for the PSS symbol.

In a sixth aspect, alone or in combination with one or more of the first through fifth aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the method further comprises determining a channel estimation for the DMRS symbol or the SSS symbol, and determining the channel estimation for the PBCH symbol based at least in part on the channel estimation for the DMRS symbol or the SSS symbol.

In a seventh aspect, alone or in combination with one or more of the first through sixth aspects, the PBCH is after, in time, all of the one or more of the PSS symbol, the SSS symbol, or the DMRS symbol within the SSB.

In an eighth aspect, alone or in combination with one or more of the first through seventh aspects, one more reference signals, of the one or more of the PSS, the SSS, or the DMRS, that are used to determine the channel estimation for the PBCH symbol have a same bandwidth as the PBCH.

In a ninth aspect, alone or in combination with one or more of the first through eighth aspects, the SSB indicates an SSB index based at least in part on a sequence of one or more of the PSS symbol or the SSS symbol, or an indication within the PBCH symbol.

In a tenth aspect, alone or in combination with one or more of the first through ninth aspects, the SSB includes a beam switching gap after the PBCH and the one or more of the PSS symbol, the SSS symbol, or the DMRS symbol.

In an eleventh aspect, alone or in combination with one or more of the first through tenth aspects, process 600 includes determining a frequency offset for the PBCH symbol based at least in part on measurement of one or more of the PSS symbol, the SSS symbol, or the DMRS symbol.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
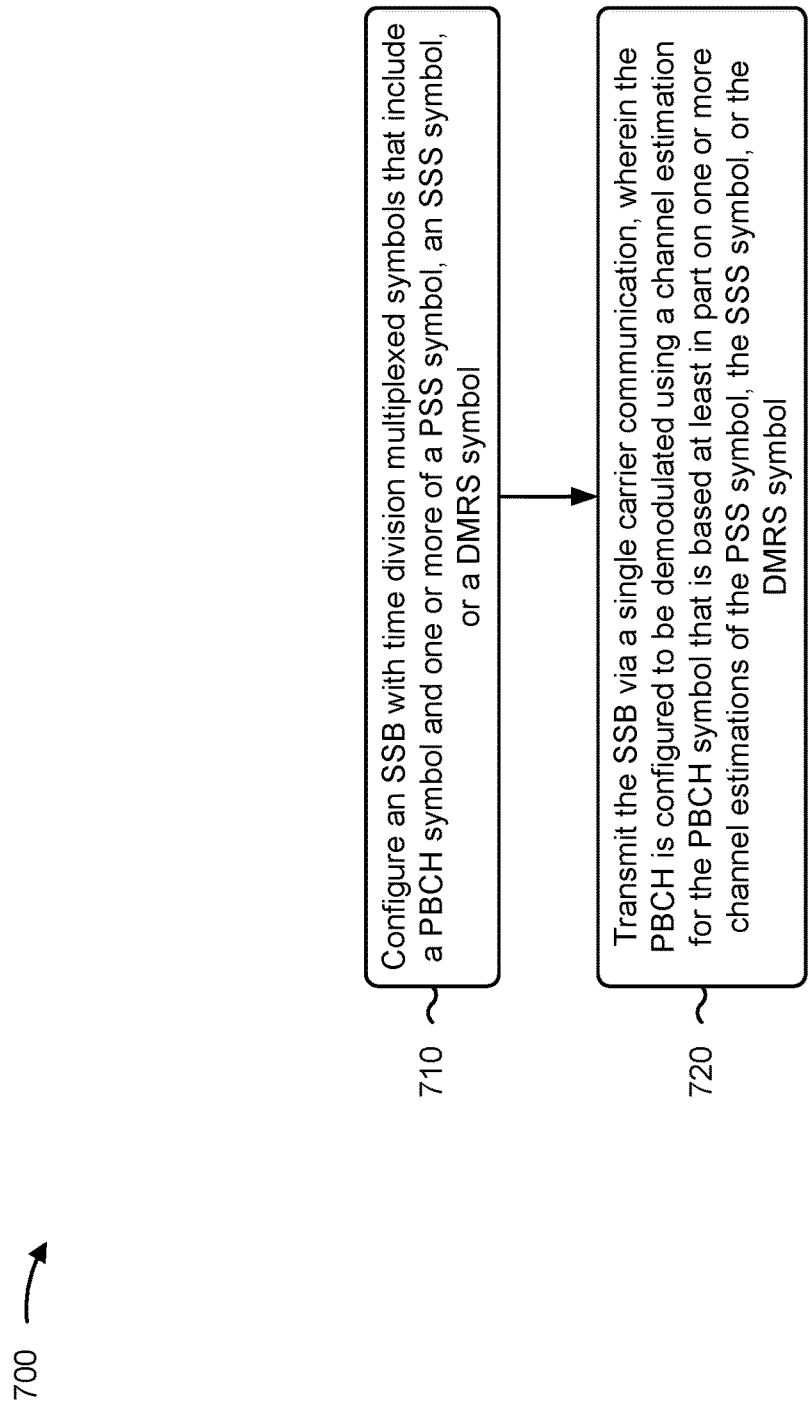

FIG. 7 is a diagram illustrating an example process 700 performed, for example, by a base station, in accordance with various aspects of the present disclosure. Example process 700 is an example where the base station (e.g., base station 110) performs operations associated with techniques for determining a channel estimation for a physical broadcast channel symbol of a synchronization signal block with time division multiplexed symbols.

As shown in FIG. 7, in some aspects, process 700 may include configuring an SSB with time division multiplexed symbols that include a PBCH symbol and one or more of a PSS symbol, an SSS symbol, or a DMRS symbol (block 710). For example, the base station (e.g., using communication manager 908, depicted in FIG. 9) may configure a SSB with time division multiplexed symbols that include a PBCH symbol and one or more of a PSS symbol, an SSS symbol, or a DMRS symbol, as described above.

As further shown in FIG. 7, in some aspects, process 700 may include transmitting the SSB via a single carrier communication, wherein the PBCH is configured to be demodulated using a channel estimation for the PBCH symbol that is based at least in part on one or more channel estimations of the PSS symbol, the SSS symbol, or the DMRS symbol (block 720). For example, the base station (e.g., using transmission component 904, depicted in FIG. 9) may transmit the SSB via a single carrier communication, wherein the PBCH is configured to be demodulated using a channel estimation for the PBCH symbol that is based at least in part on one or more channel estimations of the PSS symbol, the SSS symbol, or the DMRS symbol, as described above.

Process 700 may include additional aspects, such as any single aspect or any combination of aspects described below and/or in connection with one or more other processes described elsewhere herein.

In a first aspect, the SSB includes the PBCH symbol, the DMRS symbol, and the SSS symbol, wherein the PBCH symbol is between the DMRS symbol and the SSS symbol in time, and wherein the PBCH is configured to be demodulated based at least in part on a determination of a first channel estimation for the DMRS symbol, a determination of a second channel estimation for the SSS symbol, and an interpolation of the channel estimation for the PBCH symbol based at least in part on the first channel estimation and the second channel estimation.

In a second aspect, alone or in combination with the first aspect, the SSB includes the PBCH symbol, a first SSS symbol, and a second SSS symbol, wherein the PBCH symbol is between the first SSS symbol and the second SSS symbol in time, and wherein the PBCH is configured to be demodulated based at least in part on a determination of a first channel estimation for the first SSS symbol, a determination of a second channel estimation for the second SSS symbol, and an interpolation of the channel estimation for the PBCH symbol based at least in part on the first channel estimation and the second channel estimation.

In a third aspect, alone or in combination with one or more of the first and second aspects, the SSB indicates a cell identification (ID) associated with the SSB based at least in part on a sequence in the first SSS symbol, or wherein the SSB indicates a cell based at least in part on a first sequence detected in the first SSS symbol and a second sequence detected in the second SSS symbol.

In a fourth aspect, alone or in combination with one or more of the first through third aspects, the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the PBCH is configured to be demodulated based at least in part on a determination of a first channel estimation for the PSS symbol, a determination of a second channel estimation for the one of the SSS symbol or the DMRS symbol, and an interpolation of the channel estimation for the PBCH symbol based at least in part on the first channel estimation and the second channel estimation.

In a fifth aspect, alone or in combination with one or more of the first through fourth aspects, the SSB includes the PBCH symbol and the PSS symbol, wherein the PSS symbol is adjacent to the PBCH symbol in time, and wherein the PBCH is configured to be demodulated based at least in part on a determination of a channel estimation for the PSS symbol, and a determination of the channel estimation for the PBCH symbol based at least in part on the channel estimation for the PSS symbol.

In a sixth aspect, alone or in combination with one or more of the first through fifth aspects, the SSB includes the PBCH symbol, the PSS symbol, and one of the DMRS symbol or the SSS symbol, wherein the DMRS symbol or the SSS symbol is between the PSS symbol and the PBCH symbol in time, and wherein the PBCH is configured to be demodulated based at least in part on a determination of a channel estimation for the DMRS symbol or the SSS symbol, and a determination of the channel estimation for the PBCH symbol based at least in part on the channel estimation for the DMRS symbol or the SSS symbol.

In a seventh aspect, alone or in combination with one or more of the first through sixth aspects, the PBCH is after, in time, all of the one or more of the PSS symbol, the SSS symbol, or the DMRS symbol within the SSB.

In an eighth aspect, alone or in combination with one or more of the first through seventh aspects, one more reference signals, of the one or more of the PSS, the SSS, or the DMRS, that are used to determine the channel estimation for the PBCH symbol have a same bandwidth as the PBCH.

In a ninth aspect, alone or in combination with one or more of the first through eighth aspects, the SSB indicates an SSB index based at least in part on a sequence of one or more of the PSS symbol or the SSS symbol, or an indication within the PBCH symbol.

In a tenth aspect, alone or in combination with one or more of the first through ninth aspects, the SSB includes a beam switching gap after the PBCH and the one or more of the PSS symbol, the SSS symbol, or the DMRS symbol.

In an eleventh aspect, alone or in combination with one or more of the first through tenth aspects, a frequency offset for the PBCH symbol is configured to be determined based at least in part on measurement of one or more of the PSS symbol, the SSS symbol, or the DMRS symbol.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
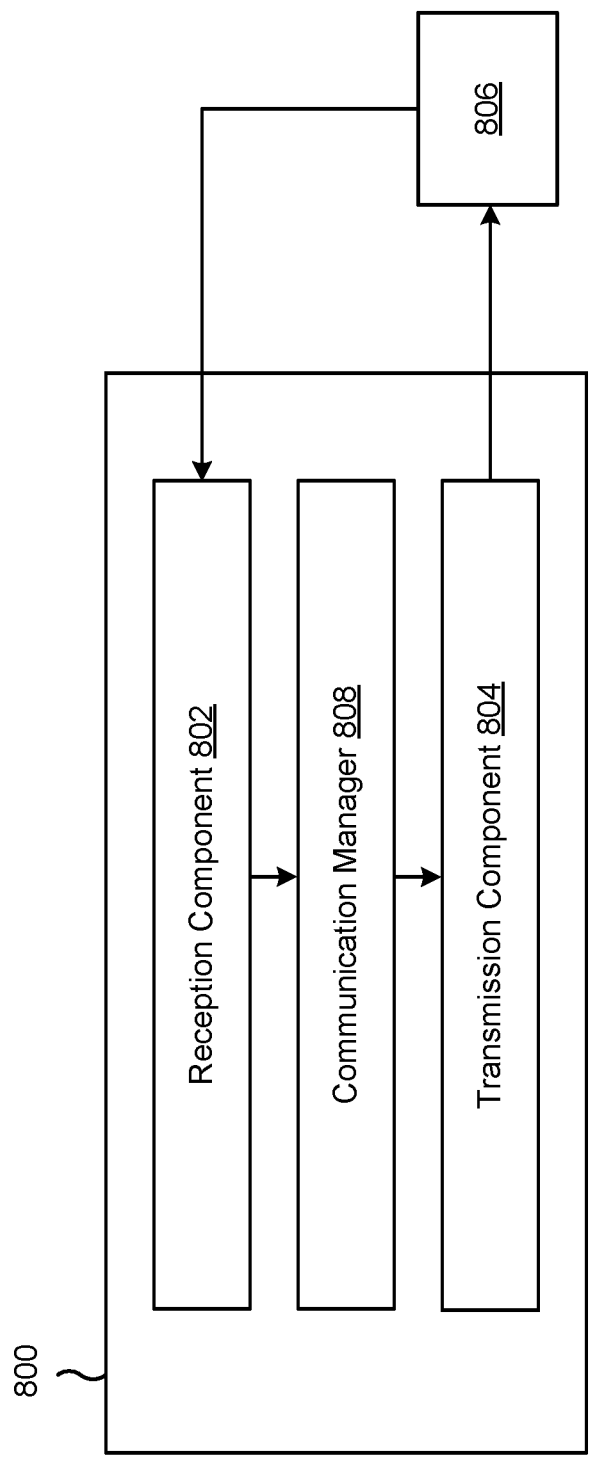
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 4-5H. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, via a single carrier communication, an SSB with time division multiplexed symbols that include a PBCH symbol and one or more of a PSS symbol, an SSS symbol, or a DMRS symbol. The communication manager 808 may demodulate the PBCH symbol using a channel estimation for the PBCH symbol that is based at least in part on one or more channel estimations of the PSS symbol, the SSS symbol, or the DMRS symbol.

The communication manager 808 may determine a cell ID associated with the SSB based at least in part on a sequence detected in the first SSS symbol.

The communication manager 808 may determine a cell ID associated with the SSB based at least in part on a first sequence detected in the first SSS symbol and a second sequence detected in the second SSS symbol.

The communication manager 808 may determine a frequency offset for the PBCH symbol based at least in part on measurement of one or more of the PSS symbol, the SSS symbol, or the DMRS symbol.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
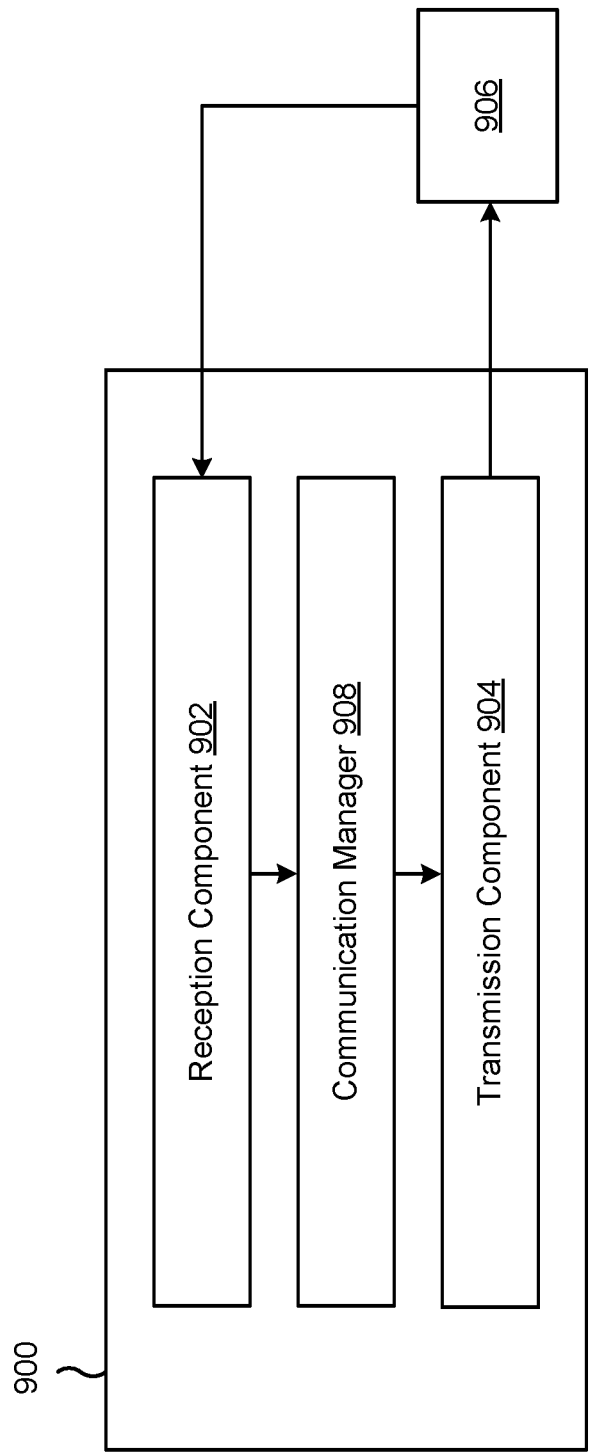

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a communication manager 908.

In some aspects, the apparatus 900 may be configured to perform one or more operations described herein in connection with FIGS. 4-5H. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The communication manager 908 may configure an SSB with time division multiplexed symbols that include a PBCH symbol and one or more of a PSS symbol, an SSS symbol, or a DMRS symbol. The transmission component 904 may transmit the SSB via a single carrier communication, wherein the PBCH is configured to be demodulated using a channel estimation for the PBCH symbol that is based at least in part on one or more channel estimations of the PSS symbol, the SSS symbol, or the DMRS symbol.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: receiving, via a single carrier communication, a synchronization signal block (SSB) with time division multiplexed symbols that include a physical broadcast channel (PBCH) symbol and one or more of a primary synchronization signal (PSS) symbol, a secondary synchronization signal (SSS) symbol, or a demodulation reference signal (DMRS) symbol; and demodulating the PBCH symbol using a channel estimation for the PBCH symbol that is based at least in part on one or more channel estimations of the PSS symbol, the SSS symbol, or the DMRS symbol.

Aspect 2: The method of aspect 1, wherein the SSB includes the PBCH symbol, the DMRS symbol, and the SSS symbol, wherein the PBCH symbol is between the DMRS symbol and the SSS symbol in time, and wherein the method further comprises: determining a first channel estimation for the DMRS symbol, determining a second channel estimation for the SSS symbol, and interpolating the channel estimation for the PBCH symbol based at least in part on the first channel estimation and the second channel estimation.

Aspect 3: The method of aspect 1, wherein the SSB includes the PBCH symbol, a first SSS symbol, and a second SSS symbol, wherein the PBCH symbol is between the first SSS symbol and the second SSS symbol in time, and wherein the method further comprises: determining a first channel estimation for the first SSS symbol, determining a second channel estimation for the second SSS symbol, and interpolating the channel estimation for the PBCH symbol based at least in part on the first channel estimation and the second channel estimation.

Aspect 4: The method of aspect 3, further comprising: determining a cell identification (ID) associated with the SSB based at least in part on a sequence detected in the first SSS symbol, or determining a cell ID associated with the SSB based at least in part on a first sequence detected in the first SSS symbol and a second sequence detected in the second SSS symbol.

Aspect 5: The method of aspect 1, wherein the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the method further comprises: determining a first channel estimation for the PSS symbol, determining a second channel estimation for the one of the SSS symbol or the DMRS symbol, and interpolating the channel estimation for the PBCH symbol based at least in part on the first channel estimation and the second channel estimation.

Aspect 6: The method of aspect 1, wherein the SSB includes the PBCH symbol and the PSS symbol, wherein the PSS symbol is adjacent to the PBCH symbol in time, and wherein the method further comprises: determining a channel estimation for the PSS symbol, and determining the channel estimation for the PBCH symbol based at least in part on the channel estimation for the PSS symbol.

Aspect 7: The method of aspect 1, wherein the SSB includes the PBCH symbol, the PSS symbol, and one of the DMRS symbol or the SSS symbol, wherein the DMRS symbol or the SSS symbol is between the PSS symbol and the PBCH symbol in time, and wherein the method further comprises: determining a channel estimation for the DMRS symbol or the SSS symbol, and determining the channel estimation for the PBCH symbol based at least in part on the channel estimation for the DMRS symbol or the SSS symbol.

Aspect 8: The method of any of aspects 1-7, wherein the PBCH is after, in time, all of the one or more of the PSS symbol, the SSS symbol, or the DMRS symbol within the SSB.

Aspect 9: The method of any of aspects 1-8, wherein one more reference signals, of the one or more of the PSS, the SSS, or the DMRS, that are used to determine the channel estimation for the PBCH symbol have a same bandwidth as the PBCH.

Aspect 10: The method of any of aspects 1-9, wherein the SSB indicates an SSB index based at least in part on: a sequence of one or more of the PSS symbol or the SSS symbol, or an indication within the PBCH symbol.

Aspect 11: The method of any of aspects 1-10, wherein the SSB includes a beam switching gap after the PBCH and the one or more of the PSS symbol, the SSS symbol, or the DMRS symbol.

Aspect 12: The method of any of aspects 1-11, further comprising: determining a frequency offset for the PBCH symbol based at least in part on measurement of one or more of the PSS symbol, the SSS symbol, or the DMRS symbol.

Aspect 13: A method of wireless communication performed by a base station, comprising: configuring a synchronization signal block (SSB) with time division multiplexed symbols that include a physical broadcast channel (PBCH) symbol and one or more of a primary synchronization signal (PSS) symbol, a secondary synchronization signal (SSS) symbol, or a demodulation reference signal (DMRS) symbol; transmitting the SSB via a single carrier communication, wherein the PBCH is configured to be demodulated using a channel estimation for the PBCH symbol that is based at least in part on one or more channel estimations of the PSS symbol, the SSS symbol, or the DMRS symbol.

Aspect 14: The method of aspect 13, wherein the SSB includes the PBCH symbol, the DMRS symbol, and the SSS symbol, wherein the PBCH symbol is between the DMRS symbol and the SSS symbol in time, and wherein the PBCH is configured to be demodulated based at least in part on: a determination of a first channel estimation for the DMRS symbol, a determination of a second channel estimation for the SSS symbol, and an interpolation of the channel estimation for the PBCH symbol based at least in part on the first channel estimation and the second channel estimation.

Aspect 15: The method of aspect 13, wherein the SSB includes the PBCH symbol, a first SSS symbol, and a second SSS symbol, wherein the PBCH symbol is between the first SSS symbol and the second SSS symbol in time, and wherein the PBCH is configured to be demodulated based at least in part on: a determination of a first channel estimation for the first SSS symbol, a determination of a second channel estimation for the second SSS symbol, and an interpolation of the channel estimation for the PBCH symbol based at least in part on the first channel estimation and the second channel estimation.

Aspect 16: The method of aspect 15, wherein the SSB indicates a cell identification (ID) associated with the SSB based at least in part on a sequence in the first SSS symbol, or wherein the SSB indicates a cell based at least in part on a first sequence detected in the first SSS symbol and a second sequence detected in the second SSS symbol.

Aspect 17: The method of aspect 13, wherein the SSB includes the PBCH symbol, the PSS symbol, and one of the SSS symbol or the DMRS symbol, wherein the PBCH symbol is between the PSS symbol and the one of the SSS symbol or the DMRS symbol in time, and wherein the PBCH is configured to be demodulated based at least in part on: a determination of a first channel estimation for the PSS symbol, a determination of a second channel estimation for the one of the SSS symbol or the DMRS symbol, and an interpolation of the channel estimation for the PBCH symbol based at least in part on the first channel estimation and the second channel estimation.

Aspect 18: The method of aspect 13, wherein the SSB includes the PBCH symbol and the PSS symbol, wherein the PSS symbol is adjacent to the PBCH symbol in time, and wherein the PBCH is configured to be demodulated based at least in part on: a determination of a channel estimation for the PSS symbol, and a determination of the channel estimation for the PBCH symbol based at least in part on the channel estimation for the PSS symbol.

Aspect 19: The method of aspect 13, wherein the SSB includes the PBCH symbol, the PSS symbol, and one of the DMRS symbol or the SSS symbol, wherein the DMRS symbol or the SSS symbol is between the PSS symbol and the PBCH symbol in time, and wherein the PBCH is configured to be demodulated based at least in part on: a determination of a channel estimation for the DMRS symbol or the SSS symbol, and a determination of the channel estimation for the PBCH symbol based at least in part on the channel estimation for the DMRS symbol or the SSS symbol.

Aspect 20: The method of any of aspects 13-19, wherein the PBCH is after, in time, all of the one or more of the PSS symbol, the SSS symbol, or the DMRS symbol within the SSB.

Aspect 21: The method of any of aspects 13-20, wherein one more reference signals, of the one or more of the PSS, the SSS, or the DMRS, that are used to determine the channel estimation for the PBCH symbol have a same bandwidth as the PBCH.

Aspect 22: The method of any of aspects 13-21, wherein the SSB indicates an SSB index based at least in part on: a sequence of one or more of the PSS symbol or the SSS symbol, or an indication within the PBCH symbol.

Aspect 23: The method of any of aspects 13-22, wherein the SSB includes a beam switching gap after the PBCH and the one or more of the PSS symbol, the SSS symbol, or the DMRS symbol.

Aspect 24: The method of any of aspects 13-23, wherein a frequency offset for the PBCH symbol is configured to be determined based at least in part on measurement of one or more of the PSS symbol, the SSS symbol, or the DMRS symbol.

Aspect 25: An apparatus for wireless communication at a device, comprising a processor; memory coupled with the processor; and instructions stored in the memory and executable by the processor to cause the apparatus to perform the method of one or more aspects of aspects 1-24.

Aspect 26: A device for wireless communication, comprising a memory and one or more processors coupled to the memory, the memory and the one or more processors configured to perform the method of one or more aspects of aspects 1-24.

Aspect 27: An apparatus for wireless communication, comprising at least one means for performing the method of one or more aspects of aspects 1-24.

Aspect 28: A non-transitory computer-readable medium storing code for wireless communication, the code comprising instructions executable by a processor to perform the method of one or more aspects of aspects 1-24.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, via a single carrier communication, a synchronization signal block (SSB) with time division multiplexed symbols that include a first symbol, a second symbol, a physical broadcast channel (PBCH) symbol between the first symbol and the second symbol in time, and a beam switching gap within the SSB, each symbol of the first symbol and the second symbol comprising a primary synchronization signal (PSS) symbol, a secondary synchronization signal (SSS) symbol, or a demodulation reference signal (DMRS) symbol; and
   demodulating the PBCH symbol using a channel estimation and a frequency offset estimation for the PBCH symbol, wherein:
      the channel estimation for the PBCH symbol is based at least in part on a time domain interpolation of a channel estimation of the first symbol and the second symbol, and
      the frequency offset estimation for the PBCH symbol is based at least in part on a frequency offset estimation for the first symbol or the second symbol.

2. The method of claim 1, wherein the first symbol is a DMRS symbol and the second symbol is an SSS symbol.

3. The method of claim 1, wherein the first symbol is a first SSS symbol and the second symbol is a second SSS symbol.

4. The method of claim 3, further comprising:
   determining a cell identification (ID) associated with the SSB based at least in part on a sequence detected in the first SSS symbol, or
   determining a cell ID associated with the SSB based at least in part on a first sequence detected in the first SSS symbol and a second sequence detected in the second SSS symbol.

5. The method of claim 1, wherein the first symbol is a PSS symbol and the second symbol is an SSS symbol or a DMRS symbol.

6. The method of claim 1, wherein one more reference signals, of the first symbol and the second symbol, that are used to determine the channel estimation for the PBCH symbol have a same bandwidth as the PBCH.

7. The method of claim 1, wherein the SSB indicates an SSB index based at least in part on:
   a sequence of one or more of a PSS symbol or an SSS symbol, or
   an indication within the PBCH symbol.

8. The method of claim 1, wherein the SSB includes the beam switching gap after the PBCH, the first symbol, and the second symbol.

9. The method of claim 1, further comprising:
   determining the frequency offset estimation for the PBCH symbol based at least in part on measurement of one or more of the first symbol or the second symbol.

10. A user equipment (UE) for wireless communication, comprising:
    one or more memories; and one or more processors coupled to the one or more memories, the one or more processors configured to:
receive, via a single carrier communication, a synchronization signal block (SSB) with time division multiplexed symbols that include a first symbol, a second symbol, a physical broadcast channel (PBCH) symbol between the first symbol and the second symbol in time, and a beam switching gap within the SSB, each symbol of the first symbol and the second symbol comprising a primary synchronization signal (PSS) symbol, a secondary synchronization signal (SSS) symbol, or a demodulation reference signal (DMRS) symbol; and
demodulate the PBCH symbol using a channel estimation and a frequency offset estimation for the PBCH symbol, wherein:
the channel estimation for the PBCH symbol is based at least in part on a time domain interpolation of a channel estimation of the first symbol and the second symbol, and
the frequency offset estimation for the PBCH symbol is based at least in part on a frequency offset estimation for the first symbol or the second symbol.

11. The UE of claim 10, wherein the first symbol is a DMRS symbol and the second symbol is an SSS symbol.

12. The UE of claim 10, wherein the first symbol is a first SSS symbol and the second symbol is a second SSS symbol.

13. The UE of claim 12, wherein the one or more processors are further configured to:
determine a cell identification (ID) associated with the SSB based at least in part on a sequence detected in the first SSS symbol, or
determine a cell ID associated with the SSB based at least in part on a first sequence detected in the first SSS symbol and a second sequence detected in the second SSS symbol.

14. The UE of claim 10, wherein the first symbol is a PSS symbol and the second symbol is an SSS symbol or a DMRS symbol.

15. The UE of claim 10, wherein one more reference signals, of the first symbol and the second symbol, that are used to determine the channel estimation for the PBCH symbol have a same bandwidth as the PBCH.

16. The UE of claim 10, wherein the SSB indicates an SSB index based at least in part on:
a sequence of one or more of a PSS symbol or an SSS symbol, or
an indication within the PBCH symbol.

17. The UE of claim 10, wherein the SSB includes a beam switching gap after the PBCH, the first symbol, and the second symbol.

18. The UE of claim 10, wherein the one or more processors are further configured to:
determine the frequency offset estimation for the PBCH symbol based at least in part on measurement of one or more of the first symbol or the second symbol.

19. A non-transitory computer-readable medium storing a set of instructions for wireless communication, the set of instructions comprising:
one or more instructions that, when executed by one or more processors of a user equipment (UE), cause the UE to:
receive, via a single carrier communication, a synchronization signal block (SSB) with time division multiplexed symbols that include a first symbol, a second symbol, a physical broadcast channel (PBCH) symbol between the first symbol and the second symbol in time, and a beam switching gap within the SSB, each symbol of the first symbol and the second symbol comprising a primary synchronization signal (PSS) symbol, a secondary synchronization signal (SSS) symbol, or a demodulation reference signal (DMRS) symbol; and
demodulate the PBCH symbol using a channel estimation and a frequency offset estimation for the PBCH symbol, wherein:
the channel estimation for the PBCH symbol is based at least in part on a time domain interpolation of a channel estimation of the first symbol and the second symbol, and
the frequency offset estimation for the PBCH symbol is based at least in part on a frequency offset estimation for the first symbol or the second symbol.

20. The non-transitory computer-readable medium of claim 19, wherein the SSB indicates an SSB index based at least in part on:
a sequence of one or more of a PSS symbol or an SSS symbol, or
an indication within the PBCH symbol.

21. The non-transitory computer-readable medium of claim 19, wherein the SSB includes a beam switching gap after the PBCH, the first symbol, and the second symbol.

22. An apparatus for wireless communication, comprising:
means for receiving, via a single carrier communication, a synchronization signal block (SSB) with time division multiplexed symbols that include a first symbol, a second symbol, a physical broadcast channel (PBCH) symbol between the first symbol and the second symbol in time, and a beam switching gap within the SSB, each symbol of the first symbol and the second symbol comprising a primary synchronization signal (PSS) symbol, a secondary synchronization signal (SSS) symbol, or a demodulation reference signal (DMRS) symbol; and
means for demodulating the PBCH symbol using a channel estimation and a frequency offset estimation for the PBCH symbol, wherein:
the channel estimation for the PBCH symbol is based at least in part on a time domain interpolation of a channel estimation of the first symbol and the second symbol, and
the frequency offset estimation for the PBCH symbol is based at least in part on a frequency offset estimation for the first symbol or the second symbol.

23. The apparatus of claim 22, wherein the SSB indicates an SSB index based at least in part on:
a sequence of one or more of a PSS symbol or an SSS symbol, or
an indication within the PBCH symbol.

24. The apparatus of claim 22, wherein the SSB includes a beam switching gap after the PBCH, the first symbol, and the second symbol.

25. The non-transitory computer-readable medium of claim 19, wherein the first symbol is a DMRS symbol and the second symbol is an SSS symbol.

26. The non-transitory computer-readable medium of claim 19, wherein the first symbol is a first SSS symbol and the second symbol is a second SSS symbol.

27. The non-transitory computer-readable medium of claim 19, wherein the first symbol is a PSS symbol and the second symbol is an SSS symbol or a DMRS symbol.

28. The apparatus of claim 22, wherein the first symbol is a DMRS symbol and the second symbol is an SSS symbol.

29. The apparatus of claim 22, wherein the first symbol is a first SSS symbol and the second symbol is a second SSS symbol.

30. The apparatus of claim 22, wherein the first symbol is a PSS symbol and the second symbol is an SSS symbol or a DMRS symbol.

* * * * *